United States Patent

Takahashi et al.

[11] Patent Number: 5,349,277
[45] Date of Patent: Sep. 20, 1994

[54] CONTROL SYSTEM FOR LEGGED MOBILE ROBOT

[75] Inventors: Hideo Takahashi; Ryutaro Yoshino, both of Saitama, Japan

[73] Assignee: Honda Giken Kogyo Kabushiki Kaisha, Tokyo, Japan

[21] Appl. No.: 29,895

[22] Filed: Mar. 11, 1993

[30] Foreign Application Priority Data

Mar. 12, 1992 [JP] Japan .................. 4-088109
Mar. 12, 1992 [JP] Japan .................. 4-088110

[51] Int. Cl.$^5$ ........................... B25J 11/00; B25J 9/00
[52] U.S. Cl. .................... 318/568.12; 318/568.11; 318/568.10; 180/8.6
[58] Field of Search .................... 318/560–646; 901/1, 3, 5, 7, 9, 12, 13, 15–23, 48; 395/80–99; 180/8.1–8.7

[56] References Cited

U.S. PATENT DOCUMENTS

| | | | |
|---|---|---|---|
| 4,621,332 | 11/1986 | Sugimoto et al. | 318/568 X |
| 4,710,884 | 12/1987 | Tokairin et al. | 364/513 |
| 4,826,392 | 5/1989 | Hayati | 901/9 |
| 4,834,200 | 5/1989 | Kajita | 180/8.1 |
| 5,115,178 | 5/1992 | Umeda | 318/568.11 |
| 5,151,859 | 9/1992 | Yoshino et al. | 364/424.02 |
| 5,159,988 | 11/1992 | Gomi et al. | 180/8.6 |
| 5,206,569 | 4/1993 | Ozawa | 318/568.12 |
| 5,221,883 | 6/1993 | Takenaka et al. | 318/568.12 |

FOREIGN PATENT DOCUMENTS

| | | |
|---|---|---|
| 62-97006 | 5/1987 | Japan . |
| 3184782 | 8/1991 | Japan . |
| 4122585 | 4/1992 | Japan . |
| 4122586 | 4/1992 | Japan . |

OTHER PUBLICATIONS

English language Abstracts of JP Applications listed above.
Publication entitled "Legged Robots on Rough Terrain: Experiments in Adjusting Step Length", Jessica Hodgins-Computer Science Department Carnegie--Mellon University (IEEE 1988).

Primary Examiner—Paul Ip
Attorney, Agent, or Firm—Lyon & Lyon

[57] ABSTRACT

A system for controlling locomotion of a biped walking robot having a body and two articulated legs each connected to the body through a hip joint and having a knee joint and an ankle joint adjacent to a foot portion. The individual joints are provided with servo motors and target angle data is provided to the servo motor in time series at a predetermined interval. The actual inclination angle of the body is detected and is then compared with upper and lower limits. If the detected value is found to be out of either of the limits, a control value of the servo motor for the hip joint of the free leg lifted off of the ground is corrected in such a manner that the free leg lands forward if the robot tilts forward, for example. A control value for the supporting leg is also corrected. Moreover, the ankle joint's angle is detected with respect to the direction of gravity and the control value of the ankle joint is corrected in response to the detected value. In addition, when the body's inclination angle exceeds either of the limits, the time interval is changed such that the robot's leg lands at a time earlier or later than the scheduled time.

20 Claims, 22 Drawing Sheets

Advance direction

CONTROL SYSTEM FOR LEGGED MOBILE ROBOT

BACKGROUND OF THE INVENTION

1. Field of the Invention

This invention relates to a control system for a legged mobile robot, more particularly to such a system for enabling a biped walking robot to walk stably even over terrain with unexpected irregularities.

2. Description of the Prior Art

Among the techniques that have been developed for enabling stable locomotion by a legged mobile robot is one which calculates the walking pattern in real time (Legged Robots on Rough Terrain; Experiments in Adjusting Step Length, by Jessica Hodgins. IEEE, 1988). Such technique cannot easily be applied for the control of a robot with multiple degrees of freedom, however, because such a robot is limited to the use of a compact, light computer too small to handle the huge amount of processing required. There have also been developed techniques for enabling walking by a legged mobile robot in which a walking pattern calculated in advance is stored in the memory of the robot's onboard computer and only simple data processing is conducted during walking. An example of a system based on this concept is taught by Japanese Laid-Open Patent Publication No. 62(1987)-97,006.

While this latter mentioned technique makes it possible to control a robot with multiple degrees of freedom using a computer that is compact and light enough to be carried by the robot, it is not always able to cope with encountered walking conditions which differ from those anticipated. Moreover, precalculation of walking pattern for a rough terrain is extremely difficult.

SUMMARY OF THE INVENTION

The object of this invention is therefore to provide a control system for a legged mobile robot which although using a compact, light-weight computer to control robot locomotion on the basis of a predesigned walking pattern also enables the robot to walk stably when it encounters unexpected irregular terrain.

For realizing this object, the present invention provides a system for controlling locomotion of a legged walking robot having a body and a plurality of articulated legs each connected to the body through a first joint and each having at least a second joint, including servo motor means provided at the individual joints of the robot and control means for providing a control value to each servo motor means such that it drives the associated joint to a target angle. In the system, the improvement comprises first means for detecting a differential of n-th order of an actual inclination angle of the body with respect to the direction of gravity and said control means correcting the control value of the first joint and/or the second joint of a free leg lifted out of the ground in response to the detected value.

BRIEF DESCRIPTION OF THE DRAWINGS

The above and other objects and advantages of the invention will be more apparent from the following description and drawings, in which.

DETAILED DESCRIPTION OF THE PREFERRED EMBODIMENTS

Embodiments of the invention will now be explained based on a biped robot as an example of a legged mobile robot.

Figure 1:
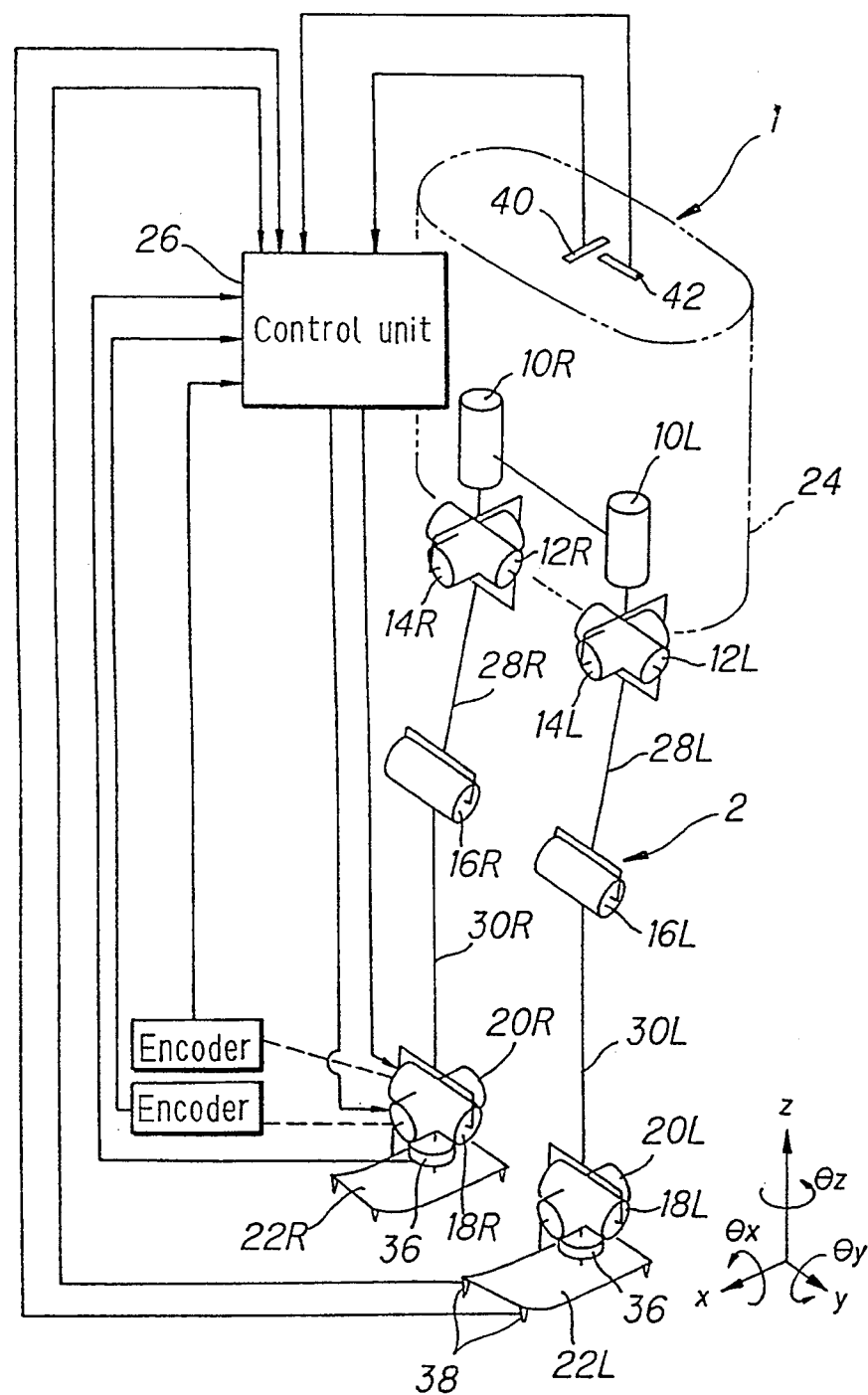
FIG. 1 is a schematic view showing the overall configuration of the legged mobile robot control system according to the invention.

An overall skeleton view of a biped robot 1 is shown in FIG. 1. The robot 1 has left and right legs each having six joints (axes). (To make the arrangement easier to understand, the joints (axes) are represented as the electric motors by which they are driven.) The six joints (axes) are, starting at the top, joints (axes) 10R, 10L for swiveling (generally horizontal rotation) of the legs at the hip (R and L indicating the right and left legs), joints (axes) 12R, 12L for rotation at the hip in the pitch direction (rotation about the y axis), joints (axes) 14R, 14L for rotation at the hip in the roll direction (rotation about the x axis), joints (axes) 16R, 16L for rotation at the knee in the pitch direction, joints (axes) 18R, 18L for rotation at the ankle in the pitch direction and joints (axes) 20R, 20L for rotation at the ankle in the roll direction. Foot members 22R, 22L are provided at the lower end of this arrangement and a body (main unit) 24 housing a control unit 26 is provided at the upper end. The hip joints in the foregoing configuration are constituted by the joints (axes) 10R(L), 12R(L) and 14R(L) and the ankle joints by the joints (axes) 18R(L) and 20R(L). The hip and knee joints are connected by thigh links 28R, 28L and the knee joints and ankle joints by crus links by 30R, 30L.

The leg links of the respective legs thus have six degrees of freedom, so that during locomotion the legs as a whole can be caused to execute the desired motion by driving the 6×2=12 joints (axes) to appropriate angle. The robot is thus capable of walking freely within three-dimensional space. The joints are provided mainly by electric motors, as was mentioned earlier, and reduction gear mechanism for increasing motor torque. The structure of the joints is described in the assignee's earlier Japanese Patent Application No. 1(1989)-324,218 (Japanese Laid-Open Patent Publication No. 3(1991)-184,782), etc., and since it is not essential aspect of the present invention, will not be explained further here.

The individual ankles of the robot 1 shown in FIG. 1 are provided with a six dimensional force and torque sensor 36 of conventional design. By measuring the x,y and z force components Fx, Fy and Fz transmitted to the robot through the foot members and also measuring the moment components Mx, My and Mz around the three axes, the six-dimensional force and torque sensor 36 detects whether or not the associated foot member has landed and the magnitude and direction of the forces acting on the supporting leg. The sole of each foot member is equipped at its four corners with touchdown switches 38 of conventional design for detecting whether or not the foot is in contact with the ground. The top of the body 24 is provided with a pair of inclination sensors 40, 42 for detecting the robot's inclination angle and angular velocity relative to z axis in the x-z and y-z planes. Each electric motor at the individual joints is provided with a rotary encoder for generating rotational information. (In FIG. 1, only encoders associated with the right ankle joints are illustrated.) The outputs of the sensors 36 and the like are sent to the control unit 26 in the body 24.

Figure 2:
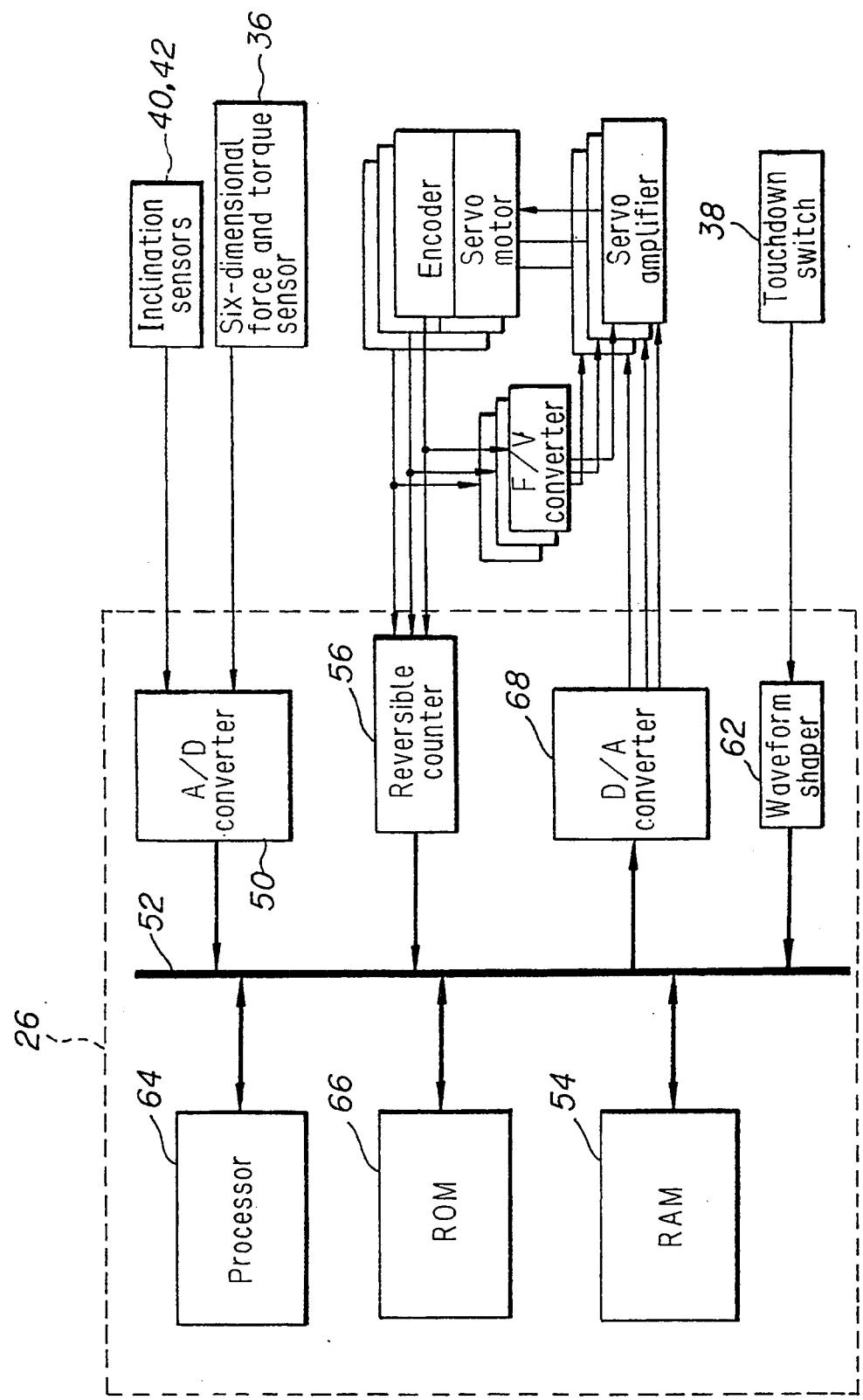
FIG. 2 is a block diagram showing the details of a control unit illustrated in FIG. 1.

As shown in the block diagram of FIG. 2, the control unit 26 has a microcomputer. The outputs from the inclination sensors 40, 42 etc. are converted into digital signals by an A/D converter 50 and the resulting digital values are sent via a bus 52 to a RAM (random access memory) 54 for storage. In addition, the outputs of encoders disposed adjacent to the respective motors are input to the RAM 54 through a counter 56, while the outputs of the touchdown switches 38 are stored in the RAM 54 via a waveform shaper 62. The control unit has a CPU (central processing unit) 64 which fetches locomotion data from a ROM (read-only memory) 66 and computes current command values from the deviation relative to the measured values received from the counter 56, and sends the same to a servo amplifier of the respective motors via a D/A converter 68. As illustrated, the output of the individual encoders is forwarded to the associated servo motor amplifier such that velocity feedback control is realized, as a minor loop.

Figure 3:
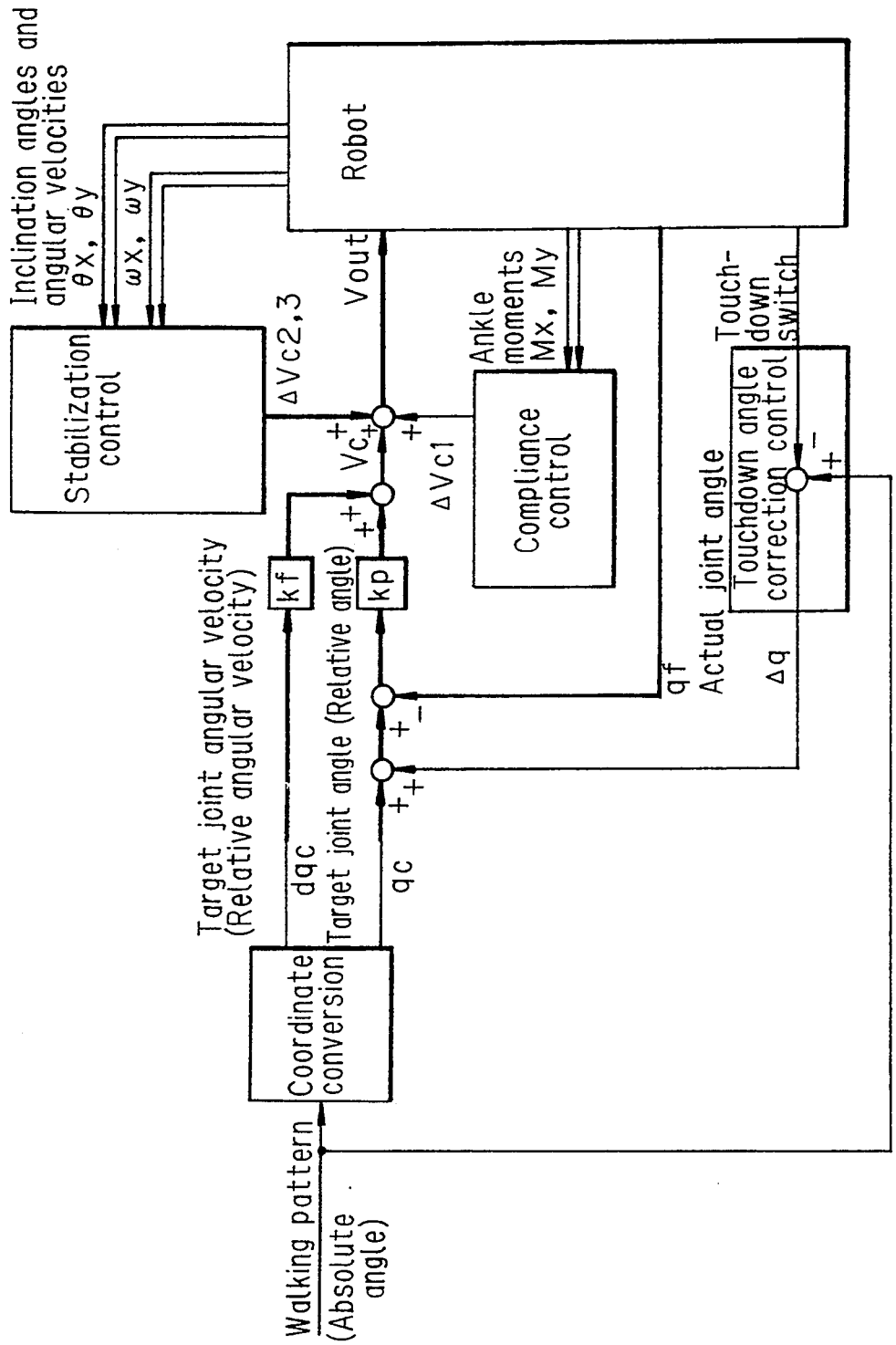
FIG. 3 is a block diagram showing the control of the system, carried out by the control unit, according to the invention.

FIG. 3 is a block diagram showing the operations of the control unit of FIG. 2. A walking pattern assuming a flat terrain is calculated offline in advance in terms of absolute angles (angles with respect to the direction of gravity). During walking, the target angle of the body is output in time series, and the target joint angle qc (relative angle) and the target joint angular velocity dqc (relative angular velocity) are output in time series for the twelve joints. The target joint angular velocity dqc refers to the difference between the target joint angle qc(t) at time t and the target joint angle qc(t+1) at time (t+1) (i.e., dqc=qc(t+1)−qc(t)). As shown in FIG. 3, following of the target values is ensured by conducting position feedback control and velocity feed forward control, thus constituting a joint angle servo control system. This invention is characterized in that it detects the inclination angles $\theta x$, $\theta y$ (absolute angles about the x and y axes) and the angular velocities omega x, omega y (absolute angular velocities about the x and y axes) of the body 24 and conducts stabilization correction control based on the detected values, and also detects the angle at which each foot contacts the ground in terms of absolute angle and corrects the target joint angle qc on the basis of the detected value. In addition, at the time of footfall it conducts compliance control for absorbing footfall impact. As a result, the robot is able to walk stably even when it encounters irregular terrain not anticipated by the walking pattern. As shown in FIG. 3, response is enhanced by putting the walking stabilization correction control at a position within the joint angle servo control system loop. This control will now be explained in detail with reference to the flow chart of FIG. 4.

Figure 4:
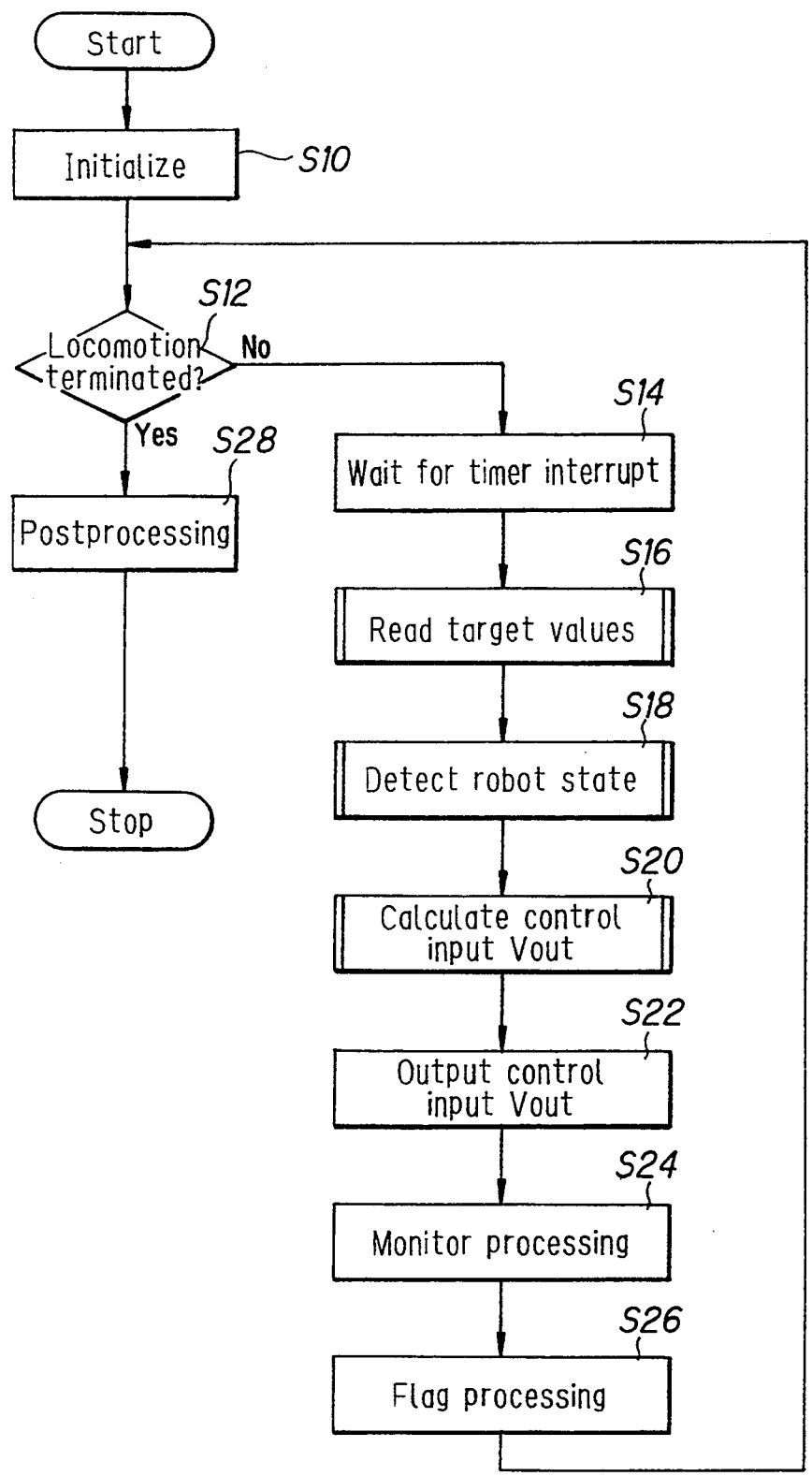
FIG. 4 is a flow chart showing the operation of the control system illustrated in FIG. 3.

The procedure of FIG. 4 begins with step S10 in which the overall system is initialized and all parameters etc. set to their initial values. Control then passes to step S12 in which a check is made as to whether or not locomotion has been terminated and, if not, to step S14 which waits for a timer interrupt. In this embodiment, the interrupt occurs once every 5 ms.

Figure 5:
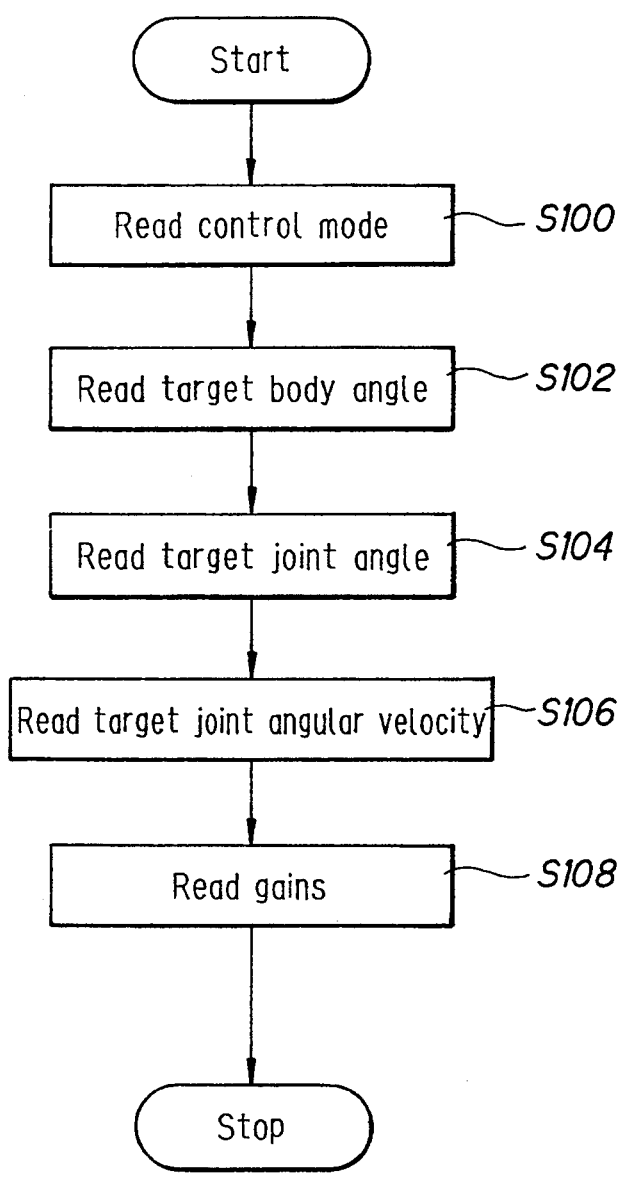
FIG. 5 is a flow chart showing the subroutine of a target value reading referred to in the flow chart of FIG. 4.
Figure 6:
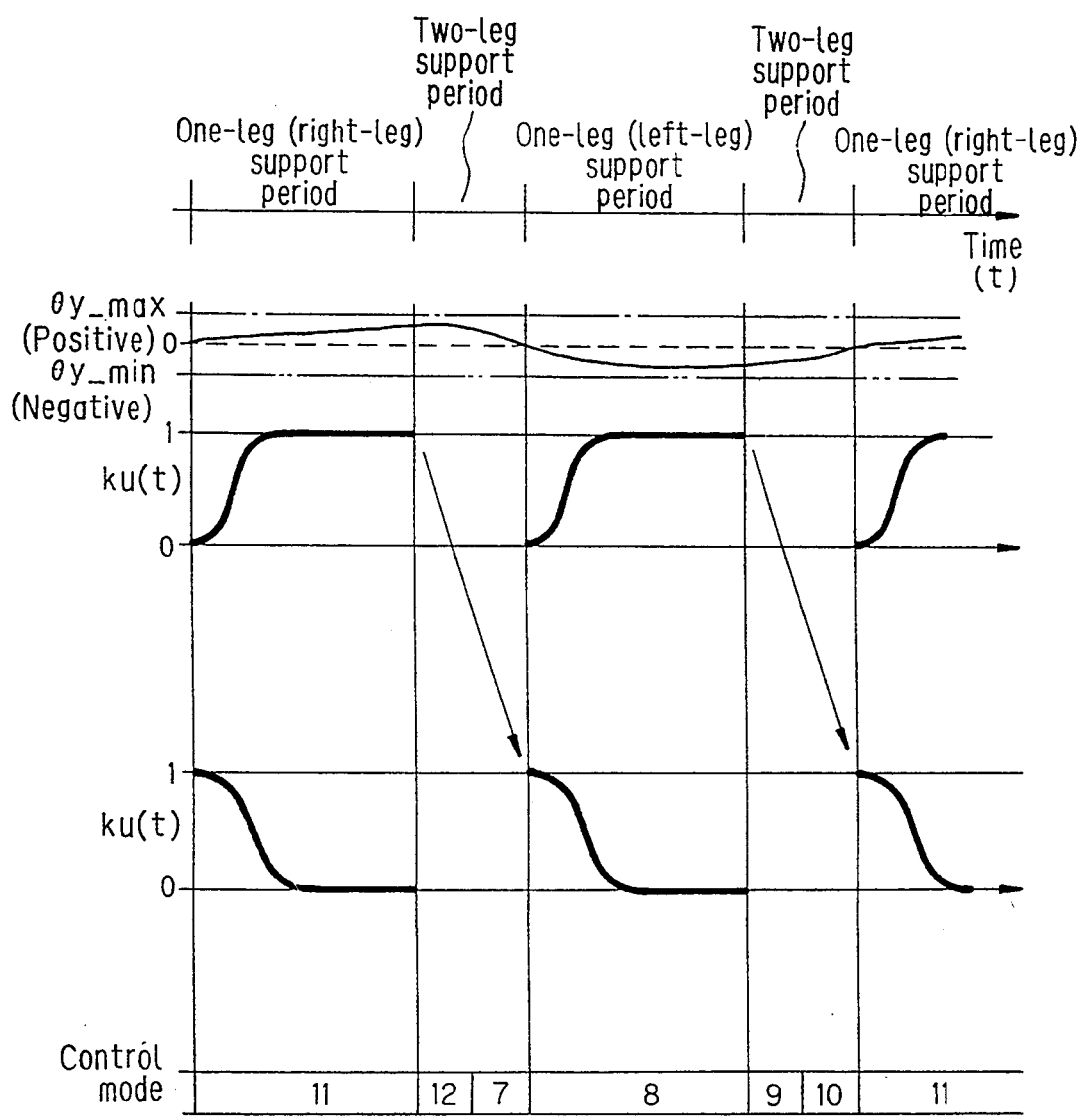
FIG. 6 is a timing chart showing the control modes referred to in the flow chart of FIG. 5.

Following timer interrupt in step S14, control passes to step S16 in which the target values are read in. This task is conducted in accordance with the subroutine of FIG. 5. The control mode is read in step S100. The control mode is indicated at the bottom of FIG. 6. In the control according to the invention, control modes 7 to 12 are established with respect to the one-leg support period and the two-leg support period. (Although not shown in the figure, modes 0 to 6 are established for standing, starting, accelerating etc. and modes numbered 13 and higher are provided for deceleration, halt etc.) Control then passes to step S102 in which the target inclination angle of the body 24 (defined by the walking pattern) is read in, to step S104 in which the target joint angle (the aforesaid qc, more specifically the target value at time t for the first joint among the twelve joints), is read in, to step S106 in which the target joint angular velocity dqc is read in., and to step S108 in which the control gains (explained later) are read in. It is possible to define the target angle of the body 24 as zero and omit step S102.

Figure 7:
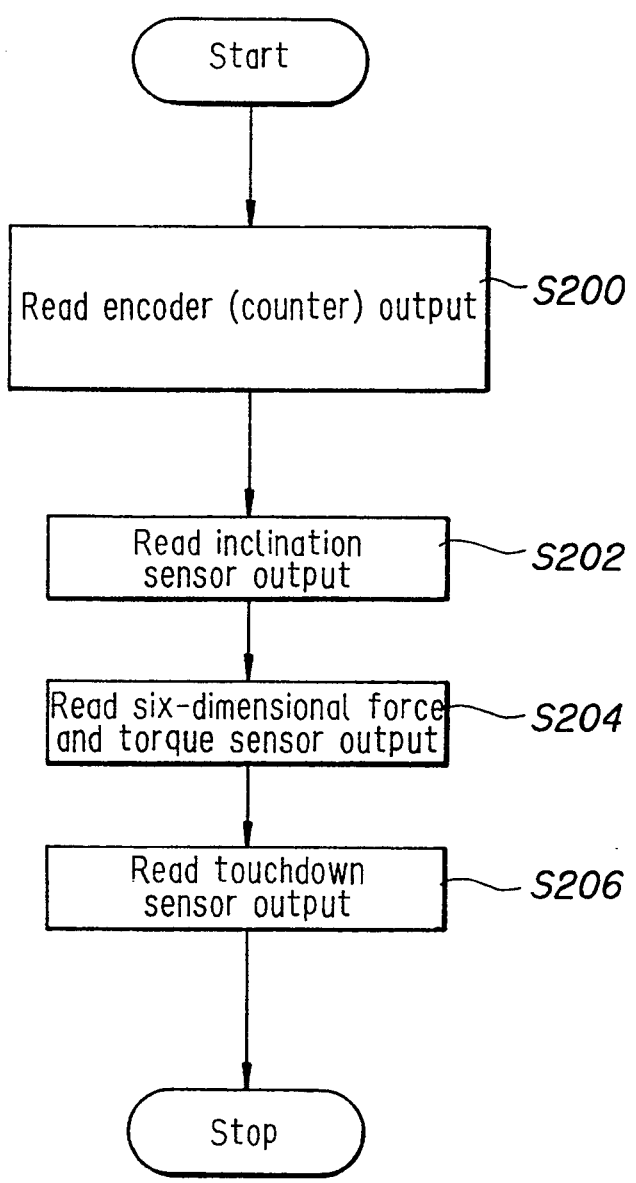
FIG. 7 is a flow chart showing the subroutine of a robot state detection referred to in the flow chart of FIG. 4.

Control then passes to step S18 of the flow chart of FIG. 4 in which the state of the robot is detected. The subroutine for this is shown by the flow chart of FIG. 7. As shogun, the outputs of the sensors and the like are read in in steps S200 to S206.

Figure 8:
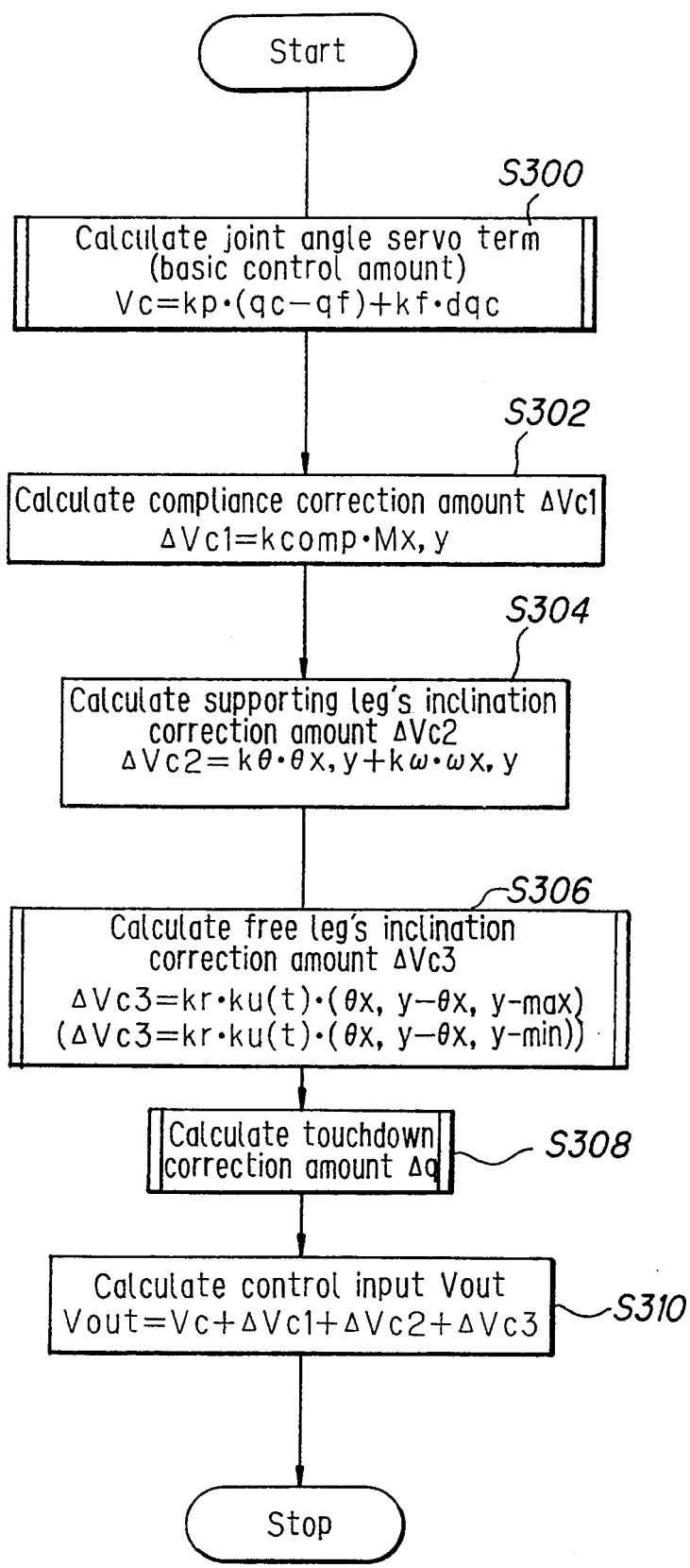
FIG. 8 is a flow chart showing the subroutine of a control input calculation referred to in the flow chart of FIG. 4.

Control then passes to step S20 in the flow chart of FIG. 4 in which a control input Vout is calculated. The subroutine for this is shown in FIG. 8. First, in step S300, a basic control amount Vc of the joint angle servo control system is calculated as $$Vc = kp \cdot (qc - qf) + kf \cdot dqc$$

The basic control amount Vc is calculated in the form of a velocity command value for the motor for each of the twelve joints. In the above equation qf is the actual joint angle and kp and kf are proportional gains (fixed or variable).

Figure 9:
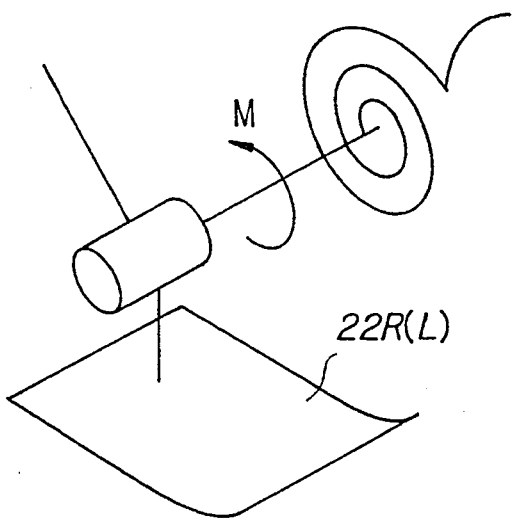
FIG. 9 is an explanatory view showing a dynamic model used in a compliance correction amount calculation referred to in the flow chart of FIG. 8.

Control next passes to step S302 which calculates a compliance correction amount delta Vc1 if free leg footfall is in progress. (The symbol delta used in connection with this and other control correction amounts signifies a slight correction with respect to the basic control amount. Like the basic control amount, the correction amounts are also calculated as motor velocity command values.) This will be explained with reference to the dynamic model of the foot 22R (L) shown in FIG. 9. The entire foot is considered to be suspended by a coil spring with a spring rate kcomp to pivot about the ankle joint, and rotational displacement is imparted in proportion to the magnitude of the moments Mx, My detected to be acting on the ankle by the six-dimensional force and torque sensor 36. That is to say, impedance control is realized through resolved motion rate control. The compliance correction amount delta Vc1 is calculated as $$\text{Delta } Vc1 = kcomp \cdot Mx \ (My)$$

This correction is conducted in respect of only the ankle joints 18, 20R (L), ankle joint 18R (L) being corrected with respect to moment My and ankle joint 20R (L) being corrected with respect to moment Mx. The proportional gain kcomp can be fixed or variable.

Figure 10:
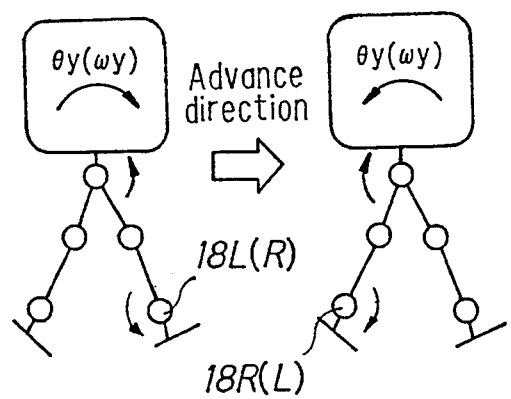
FIG. 10 is an explanatory view showing the subroutine of an inclination correction amount calculation for the support leg referred to in the flow chart of FIG. 8.

Control then passes to step S304 in which a correction amount delta Vc2 for the supporting leg is calculated from the inclination angle and the inclination angular velocity. This correction amount delta Vc2 is calculated for the supporting leg hip joints 12, 14R (L) and ankle joints 18, 20R (L) during the two-leg support period and the one-leg support period (see FIG. 10), based on the inclination angles $\theta x$, $\theta y$ and the inclination angular velocities omega x, omega y of the body 24.

$$\text{Delta } Vc2 = k\theta \cdot \theta x \ (\theta y) + k \text{ omega} \cdot \text{omega} \times (\text{omega } y)$$

In other words, the degree of instability of the robot's attitude is detected in terms of the inclination of the body 24 and the inclination is corrected to restore the robot to a stable attitude. The proportional gains $k\theta$, k omega can be fixed or variable.

Control next passes to step S306 in which a similar correction amount delta Vc3 is calculated for the free leg side hip joints 12, 14R (L). This will be explained with respect to the subroutine of FIG. 11. First, in step S400, the correction amount delta Vc3 is calculated. The subroutine for this is shown in FIG. 12. In steps S500 to S504 of this subroutine it is discriminated whether the mode is 8 (left leg support period) or 11 (right leg support period) and if it is found to be one of these, the correction amount is calculated as described below. If it is not, the subroutine is terminated.

Figure 12:
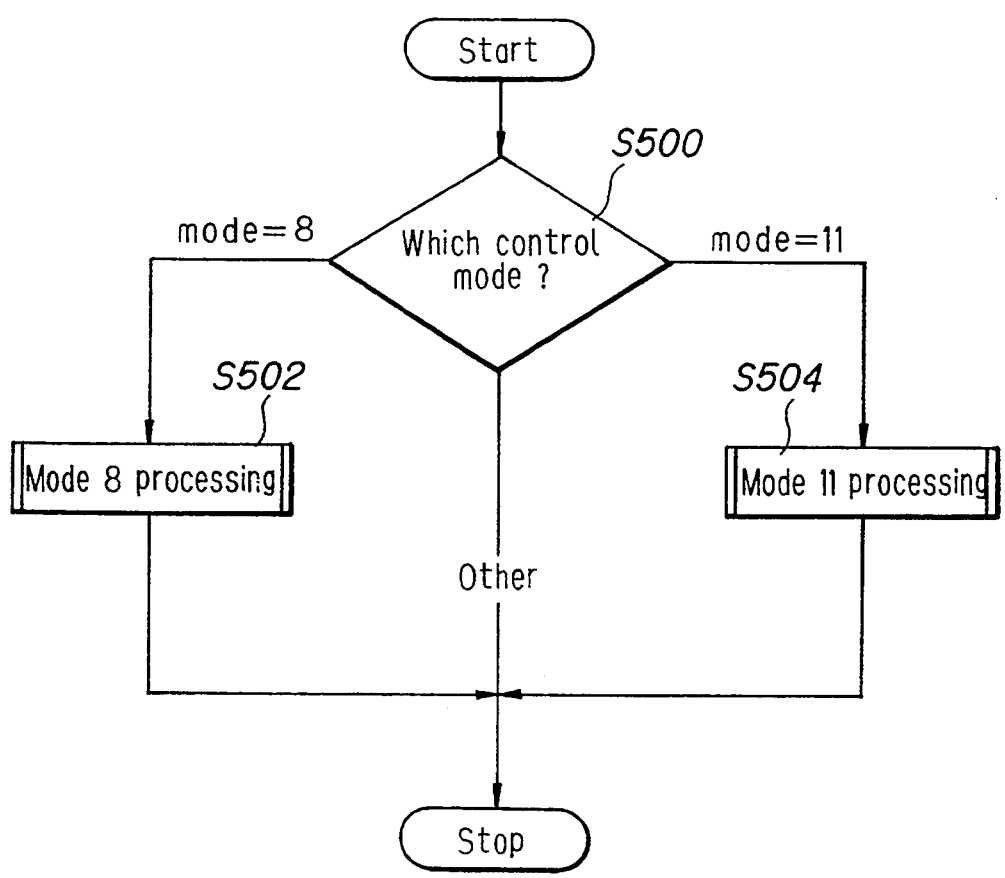
FIG. 12 is a flow chart showing a control mode discrimination for the correction amount calculation referred to in the flow chart of FIG. 11.
Figure 13:
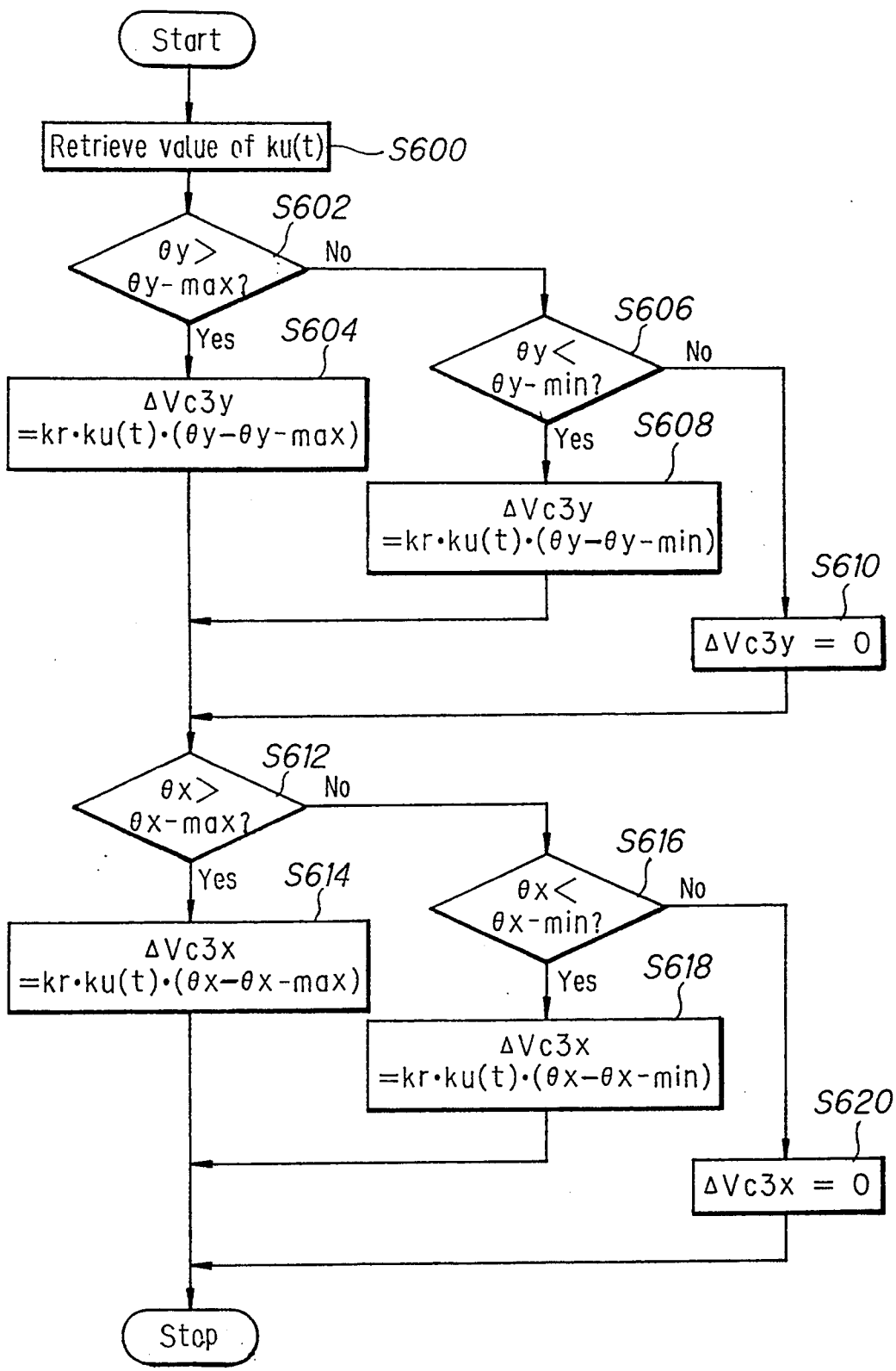
FIG. 13 is a flow chart showing the subroutine of the correction amount calculation when the control mode is discriminated to be a left leg support period from the flow chart of FIG. 12.
Figure 14:
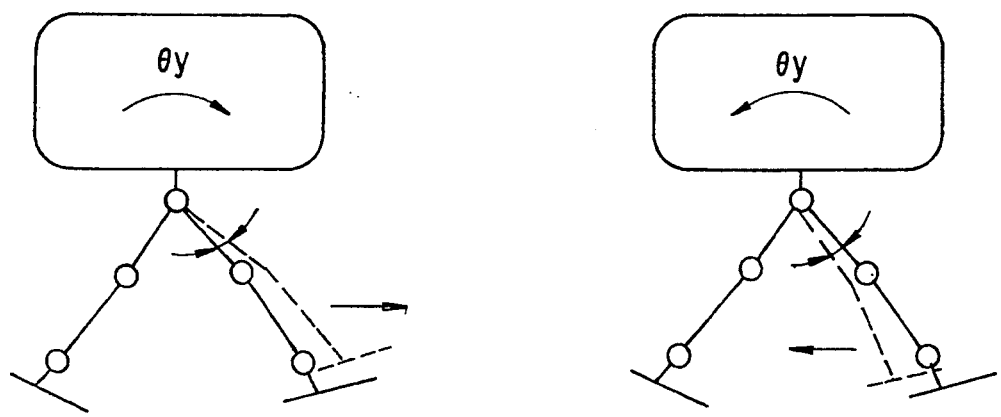
FIG. 14 is an explanatory view showing the free leg's inclination correction carried out in the flow chart of FIG. 13.

The subroutine of FIG. 13 is executed when the mode is discriminated to be 8 (left leg support period) in the subroutine of FIG. 12, namely is executed in respect of the right leg joints 12, 14R. First, in step S600, the value of a coefficient ku(t) is retrieved. As shown in FIG. 6, this is a coefficient defined to increase with the passage of time during the one-leg (right or left) support period. Data corresponding to its characteristic curve are stored in the ROM 66 as a look-up table. In step S600, the value of the coefficient is retrieved with reference to the time t from the start of the left leg support period. In step S602 and the succeeding steps, the correction amount (defined as delta Vc3y) for the fore/aft direction, i.e. for the joint 12R, is first calculated. In step S602, the detected inclination angle $\theta y$ (inclination angle of the body 24 about the y axis) is compared with a first prescribed value $\epsilon y - max$ (an appropriately defined value on the positive side; see FIG. 6) and if it is found to be larger, control passes to step 604 in which the amount in excess is multiplied by the aforesaid ku(t) and proportional coefficient (gain) kr (fixed or variable) to obtain the correction amount delta Vc3y. If the value detected in S602 is found to be not greater than the first predetermined value, control passes to step S606 in which it is compared with a second prescribed value $\theta y - min$ (an appropriately defined value on the negative side) and if it is found to be smaller, the difference is multiplied by ku(t) and kr to obtain the correction amount delta Vc3y. The significance of this will be better understood from FIG. 6. The first and second prescribed values are set relative to the variation in inclination or tilt the robot experiences during normal walking and if the actual inclination or tilt angle is found to be outside the range defined by the predetermined values, the control amount is corrected in proportion to the amount of deviation. As shown in FIG. 14, the result of this is that when the robot tilts forward, the foot of the free leg can be made to land forward of the position prescribed by the walking pattern, whereas when it tilts rearward it can be made to land rearward thereof. Thus, when the attitude of the robot 1 is disturbed by unexpected terrain irregularities, it is able to restore the proper attitude immediately. In a similar manner, as explained in the following, a left inclination is coped with by shifting the footfall position leftward and a right inclination by shifting it rightward.

Figure 15:
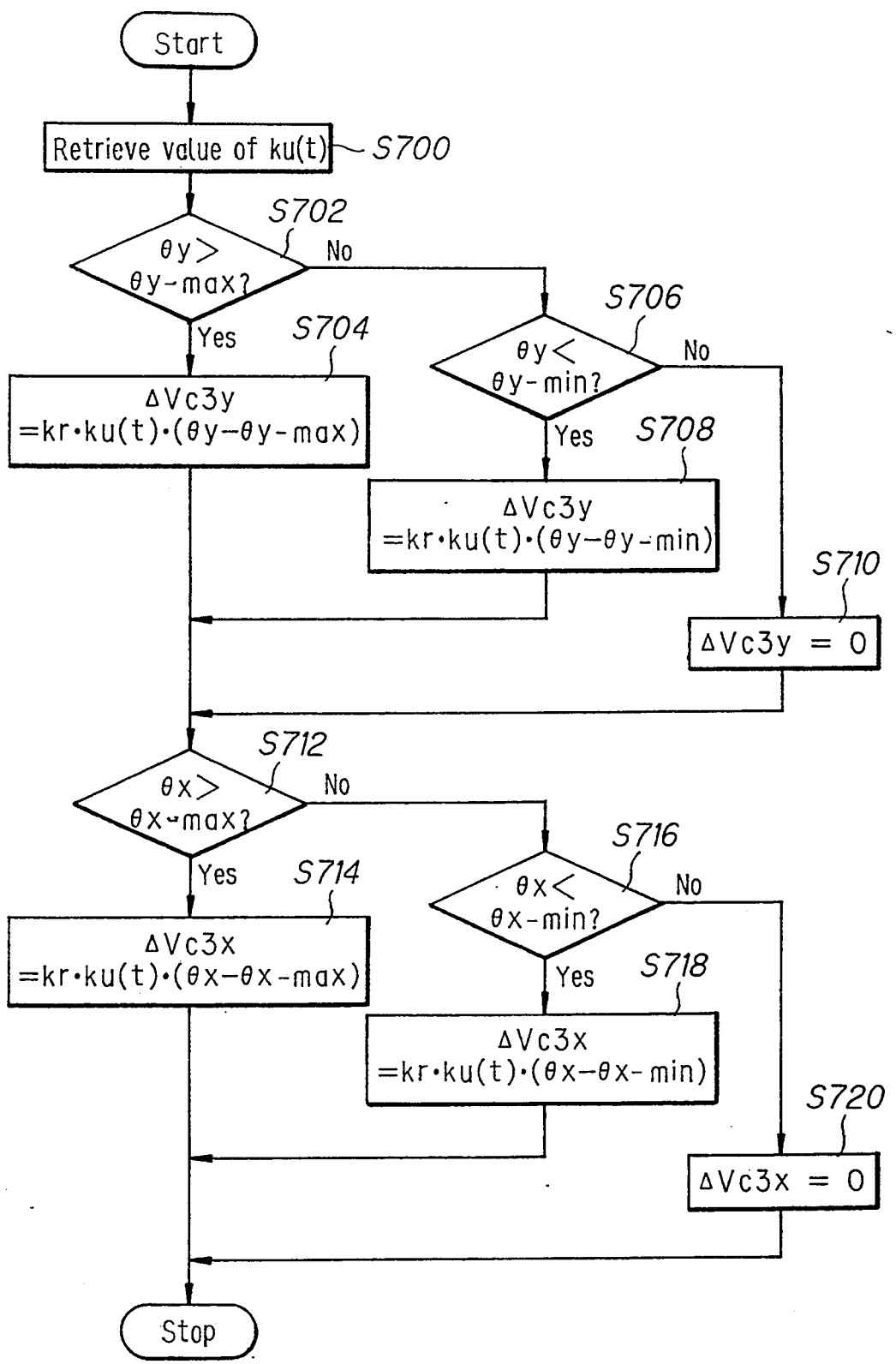
FIG. 15 is a flow chart, similar to FIG. 13, but showing the subroutine of the calculation when the control mode is discriminated to be a right leg support period form the flow chart of FIG. 12.

If the result of the comparisons in steps S602 and S606 of the flow chart of FIG. 13 are negative, control passes to step S610 in which the correction amount is set to zero. Operations similar to those explained above for calculating the fore/aft correction amount (about the y axis) , i.e. the correction amount for the joint 12R (L), are also conducted for calculating the left/right correction amount (about the x axis) for the joint 14R (L). In steps S612 to S620, when the left/right inclination angle $\theta x$ is greater than a first prescribed value $\theta x-\max$ or less than a second prescribed value ex-min, a correction amount (defined as delta Vc3x) is calculated. (The characteristics of $\theta x-\max$, $\theta x-\min$ are appropriately set similarly to $\theta y-\max$, $\theta y-\min$ in FIG. 6.) The flow chart of FIG. 15 is for calculating the correction amounts delta Vc3x, y during control mode 11 (right leg support). Aside from the fact that the correction relates to the left side joints 12L, 14L, the procedures of steps S700 to S720 for calculating the correction amounts are the same as those in FIG. 13.

Figure 11:
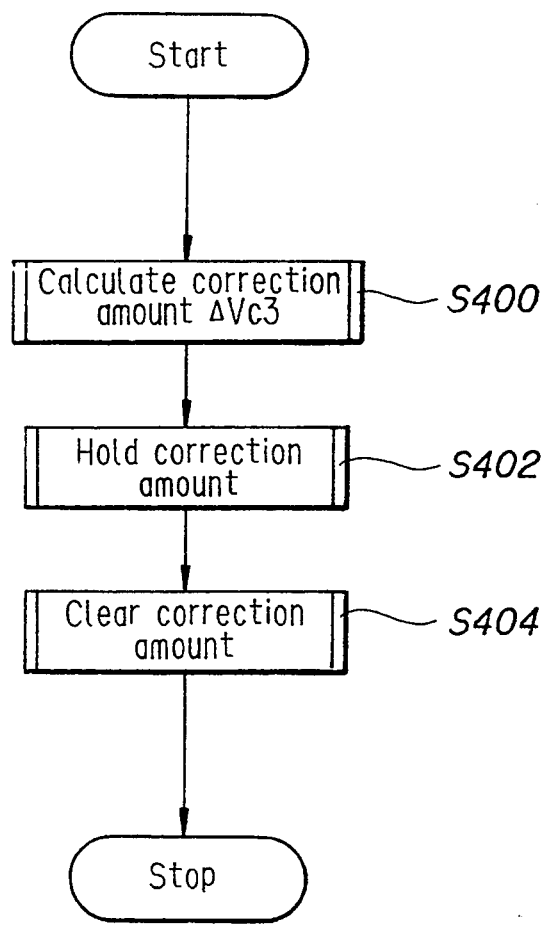
FIG. 11 is a flow chart showing the subroutine of a similar inclination correction amount calculation for the free leg referred to in the flow chart of FIG. 8.

Control next passes to step S402 in the flow chart of FIG. 11 in which the correction amounts delta Vc3x, y are held. While the correction amounts delta Vc3x, y are held during the two-leg support period following footfall of the corrected free leg, they are unnecessary and have to be made zero after footrise. The coefficient ku(t) is therefore defined as shown in FIG. 6, namely such that after the correction amounts have been held through the two-leg support period, they are gradually reduced as indicated by the arrows during the ensuing one-leg support period (free leg switchover period) so as not to generate shock.

Figure 16:
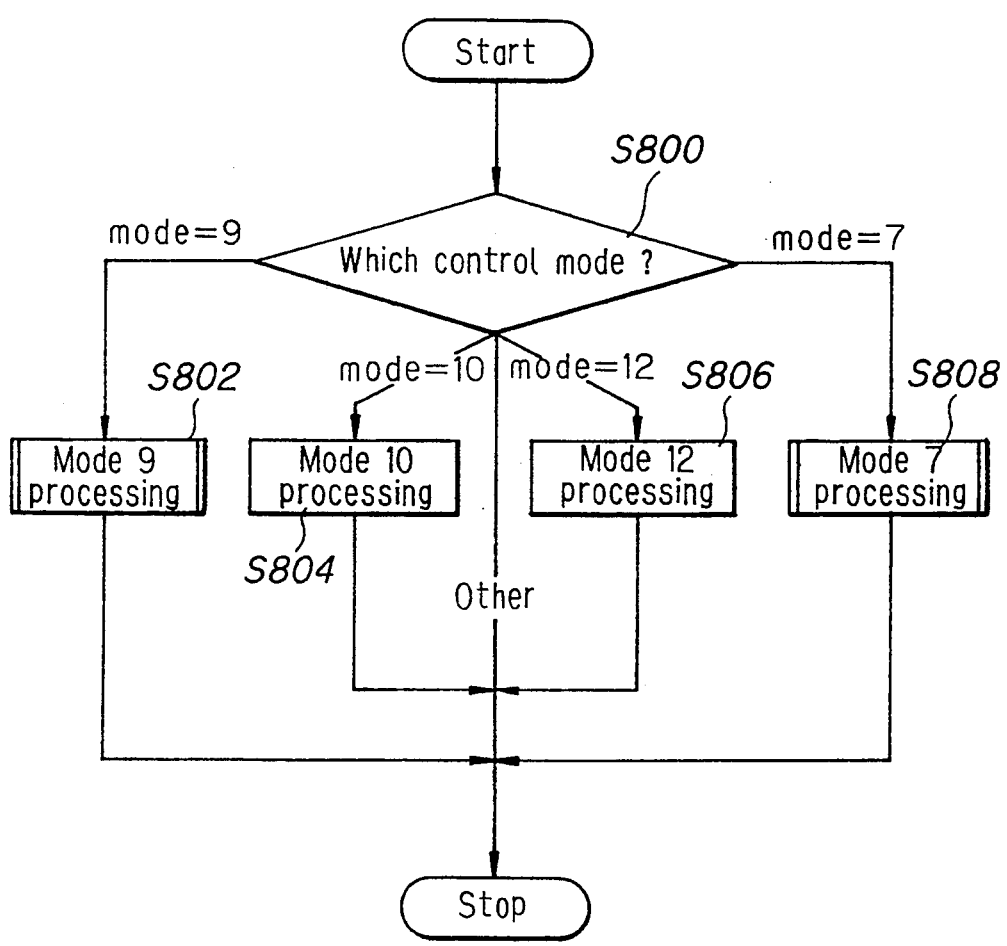
FIG. 16 is a flow chart showing a control mode discrimination for a correction amount holding referred to in the flow chart of FIG. 11.
Figure 17:
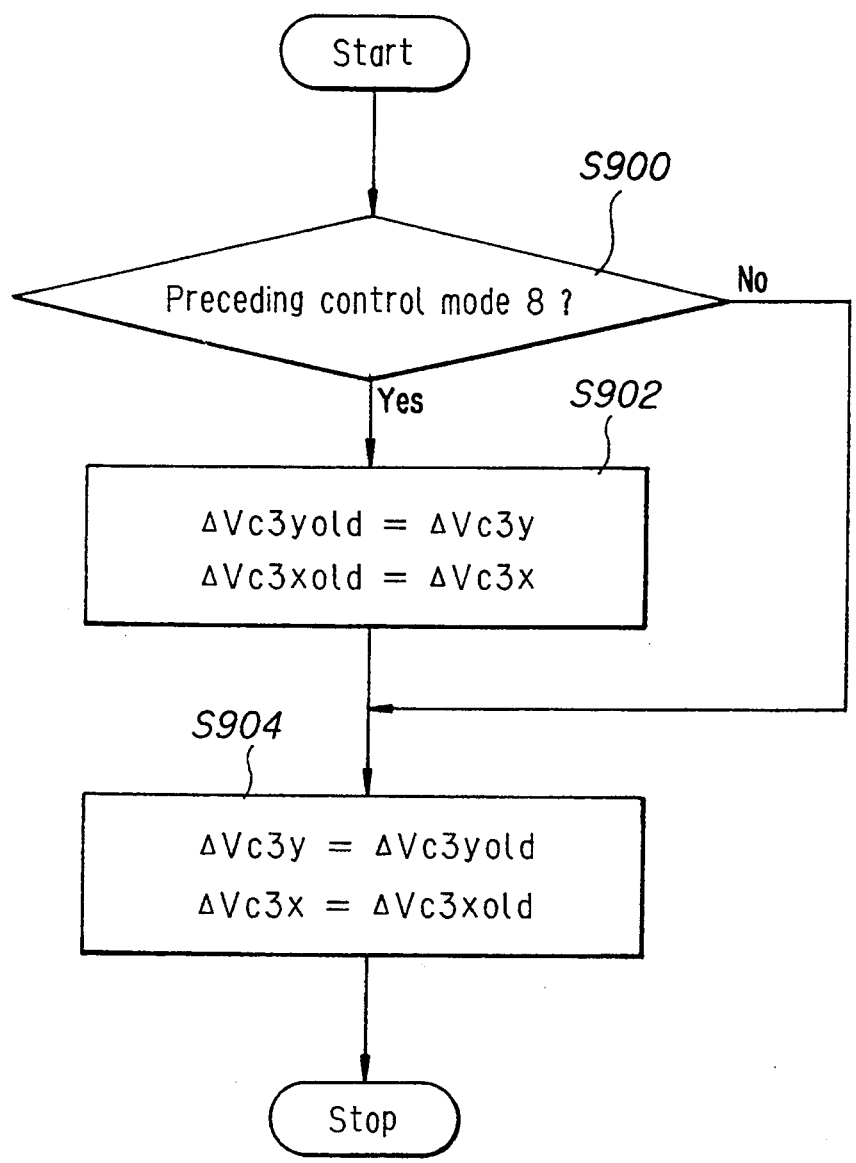
FIG. 17 is a flow chart showing the subroutine of the correction amount holding when the control mode is discriminated to be the first half of a two-leg support period from the flow chart of FIG. 16.
Figure 18:
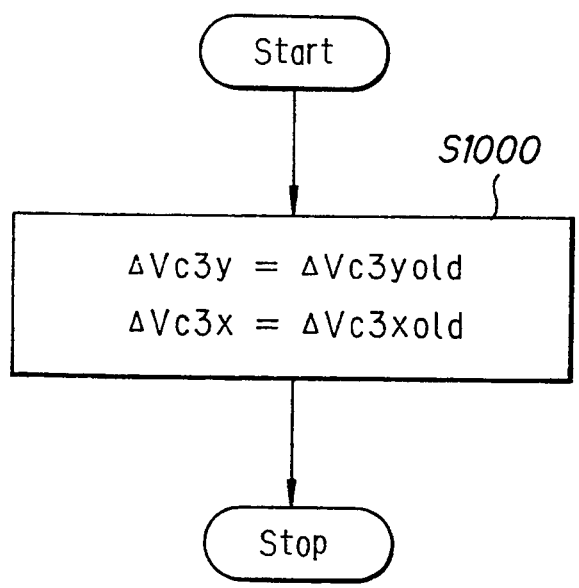
FIG. 18 is a flow chart, similar to FIG. 17, but showing the subroutine of the holding when the control mode is discriminated to be the latter half of the two-leg support period from the flow chart of FIG. 16.

FIG. 16 is the subroutine for the correction amount hold operation. In steps S800 to S808 of this subroutine a discrimination is made as to whether the control mode is 9, 10, 12 or 7. As shown in FIG. 6, these are the control modes for the two-leg support periods. If one of these four control modes is active, the correction amounts delta Vc3x, y calculated during the preceding one-leg support period is held. If the active control mode is 9 (first half of two-leg support period) or 7 (second half of two-leg support period), then, taking the subroutine for control mode 9 shown in FIG. 17 as an example, a check is made in step S900 as to whether or not the control mode in the preceding cycle was 8 (left leg support period (right leg free)). If the result is affirmative, control passes to step S902 in which the right leg correction amounts delta Vc3x, y (initially calculated values) are designated held correction amounts delta Vc3x, yold and then to step S904 in which the held control amounts are defined as the control amounts. Accordingly, the control input in this control mode (two-leg support period) is the sum of the basic control amount Vc and the held amount delta Vc3x, y. If the result of the check in step S900 is negative, control skips to step S904 and the correction amounts delta Vc3x, yold held up to that time (if any) are defined as the correction amounts. On the other hand, if the active mode is that for the latter half of the two-leg support period shown in FIG. 18 (mode 7), since the preceding period was not a one-leg support period but the first half of a two-leg support period, no step is required for replacing the value calculated in the one-leg support period (only if one was calculated) with the value to be held and the held value is simply defined as the correction value in step S1000.

Figure 19:
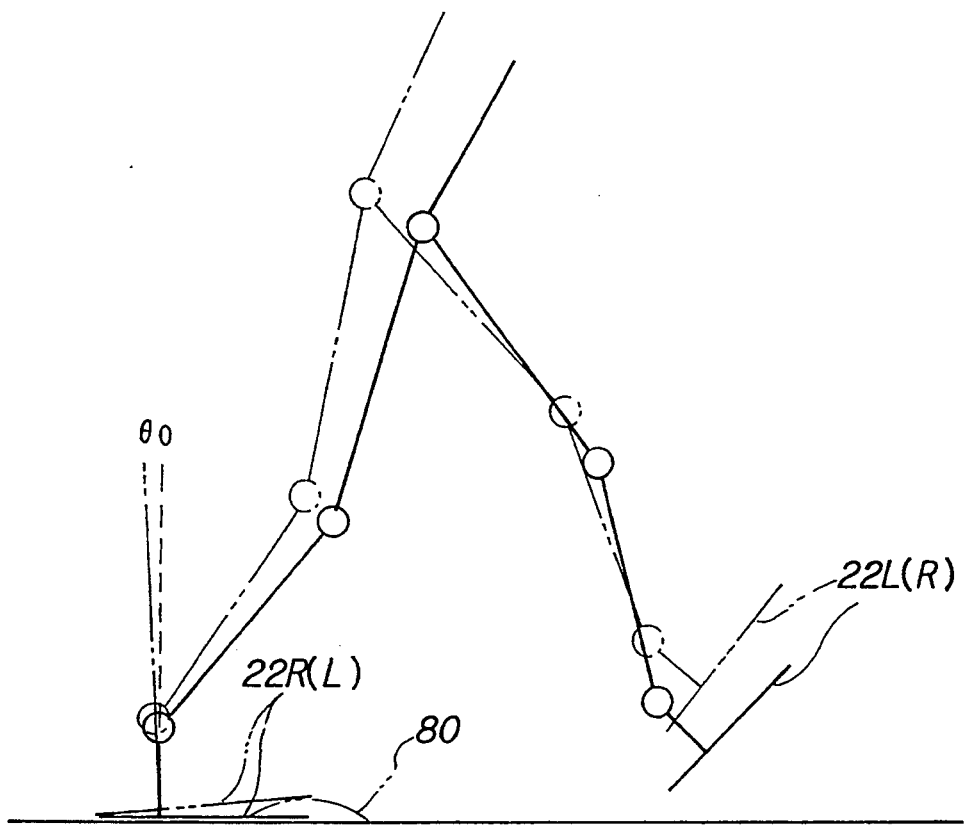
FIG. 19 is an explanatory view showing a touchdown correction amount calculation referred to in the flow chart of FIG. 8.

Control then passes to step S308 of the flow chart of FIG. 8 in which the touchdown correction amount delta q is calculated. This touchdown correction amount delta q is for correcting the target joint angle qc on the basis of the detected deviation $\theta O$ in the absolute angle of the foot angle at the time of footfall. More specifically, when the foot 22R (L) of the robot 1 lands on level ground, the absolute value of the foot angle is zero degrees, but when, as shown in FIG. 19, it lands on a projection 80 or the like, the robot tilts. As a result, the deviation $\theta O$ arises. For restoring the proper attitude, therefore, the target angles qc of the ankle joints 18, 20R (L) are corrected by the amount delta q, a function of the deviation $\theta O$, during the ensuing two-leg support period and the one-leg support period which follows it.

Figure 20:
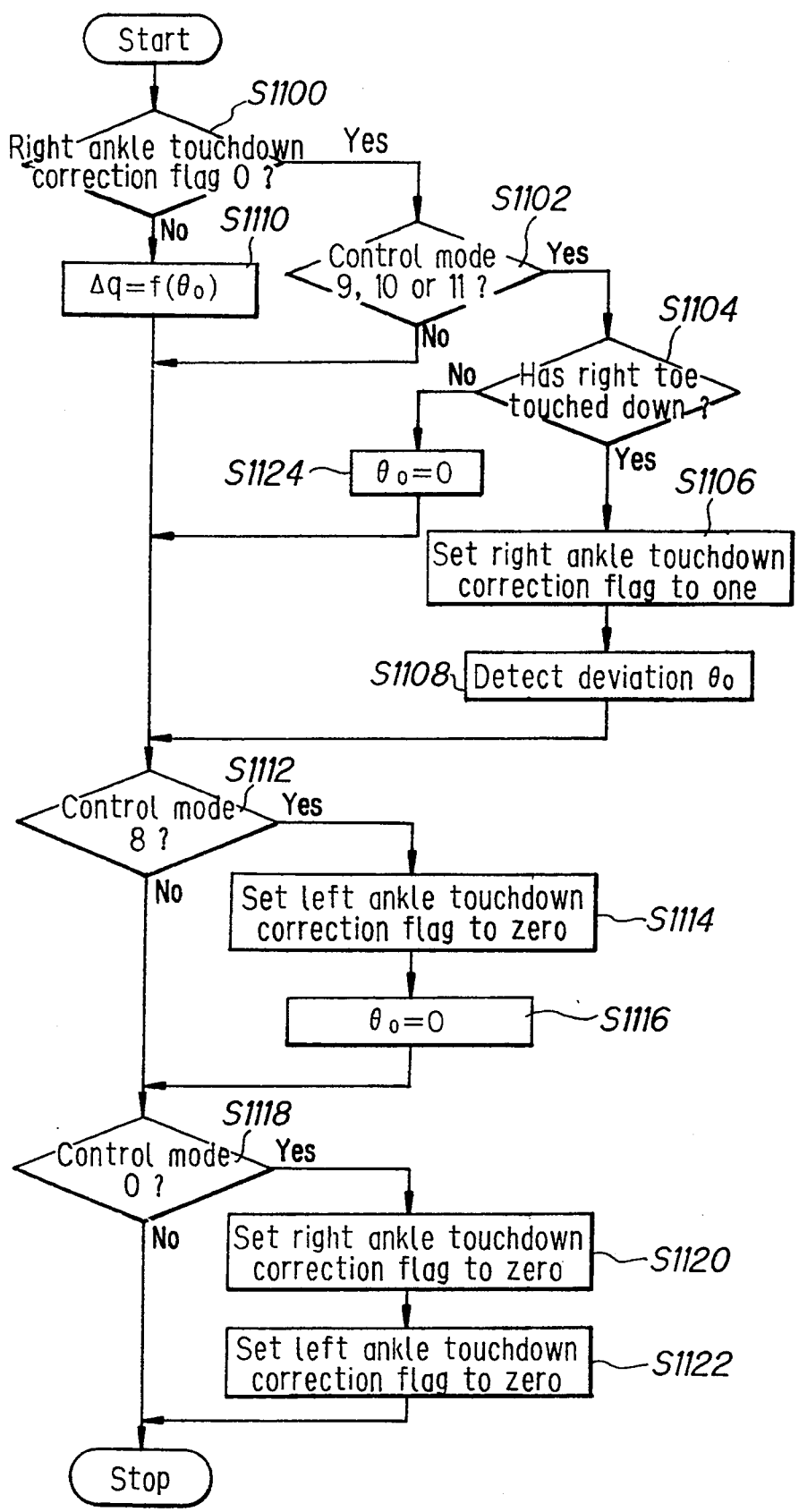
FIG. 20 is a flow chart showing the subroutine of the touchdown correction amount calculation referred to in the flow chart of FIG. 8.

This will be explained with reference to the subroutine of FIG. 20 for the case of determining delta q for the right ankle joints. In step S1100, a check is made as to whether or not the bit of a right ankle touchdown correction flag (explained later) is zero and if it is, control passes to step S1102 in which a discrimination is made as to whether the active control mode is 9, 10 or 11, i.e. a control mode for a period in the interval starting with the left leg support (right leg free) period and passing through the two-leg support period to the right leg support (left leg free) period. If the result is affirmative, control passes to step S1104 in which a discrimination is made as to whether the toe of the right foot 22R has touched down and if the result is affirmative, to step S1106 in which the aforesaid flag is set to 1 and to step S1108 in which the deviation $\theta O$ between the detected value and the set value is calculated. Therefore, in the next and later program cycles the result in step S1100 becomes negative and control passes to step S1110 in which the target joint angle correction amount delta q is calculated as a function of the deviation, to step S1112 in which a check is made as to whether the control mode is 8 (left leg support period (right leg free)) and if it is, to step S1114 in which the left ankle touchdown correction flag bit is set to zero, and to step S1116 in which the deviations for the left ankle joints 18, 20L are set to zero. Control then passes to step S1118 in which a check is made as to whether the control mode is 0 (initial value) and if the result is affirmative, to steps S1120 and S1122 in which the bits of the flags for the right and left ankles are reset to zero. If the result in step S1102 is negative, control jumps directly to step S1112 and if the result in step S1104 is negative, control passes to step S1124 in which the left ankle deviation is set to zero and then to step S1112.

Control then passes to step S310 in the flow chart of FIG. 8 in which any of the aforesaid correction amounts that have been calculated are added to the basic control amount Vc to obtain the control input Vout. It is important to note here that priority is established among the joints in connection with the order in which the addition is calculated. Specifically, joints are assigned priority in the order of the supporting leg hip joints 12, 14R (L), the supporting leg ankle joints 18, 20R (L) and the free leg hip joints 12, 14L (R), and the addition is conducted in this order. In other words, a joint making a larger contribution to stable attitude maintenance is assigned a higher priority. When time for the control is limited, therefore, the control input may be calculated, for example, only for the ankle joints and hip joints of the supporting leg. It is also possible to apply this priority to the calculation of the correction amount in the flow chart of FIG. 8 and to omit the calculation of the correction amounts for low priority joints when time is limited.

Control then passes to step S22 of the flow chart of FIG. 4 in which the control input is output, to step S24 in which monitor processing is conducted and to step S26 in which flag processing is conducted, whereafter the same operations are repeated until step S12 determines that locomotion has been terminated. Thus the calculation of the control input is conducted serially for the individual joints. For example, it starts with joint 10R at time t and proceeds to the final joint 20L, whereafter it returns to the first joint to determine the operation amount thereof at time t+1. When it is found that the locomotion has been terminated, control passes to step S28 in which required postprocessing is conducted and the control is then terminated.

In the embodiment just described, the control unit of a biped walking robot equipped with a joint angle servo control system corrects the control amounts of the supporting leg and the free leg on the basis of the amount of body inclination and also corrects the target ankle joint angles on the basis of the foot angle. As a result, the robot is able to walk stably at all times, even when it encounters rough terrain not anticipated by the walking pattern. In addition, compliance control is conducted at the time of footfall. Since the impact experienced at footfall can therefore be absorbed, the walking smoothness can be further enhanced.

In the foregoing embodiment, the corrections conducted with respect to the basic control amount include those for the free leg hip joints and a number of others. It is not necessary to conduct all of these, however, and certain ones can be selected as desired.

Further, the free leg's hip joints are corrected from the inclination angle, they may alternatively be corrected from the inclination angular velocity. Moreover, instead of or in addition to the hip joints of the free leg, it may alternatively possible to correct other joints such as the knee joint from the inclination angle and/or angular velocity.

Figure 21:
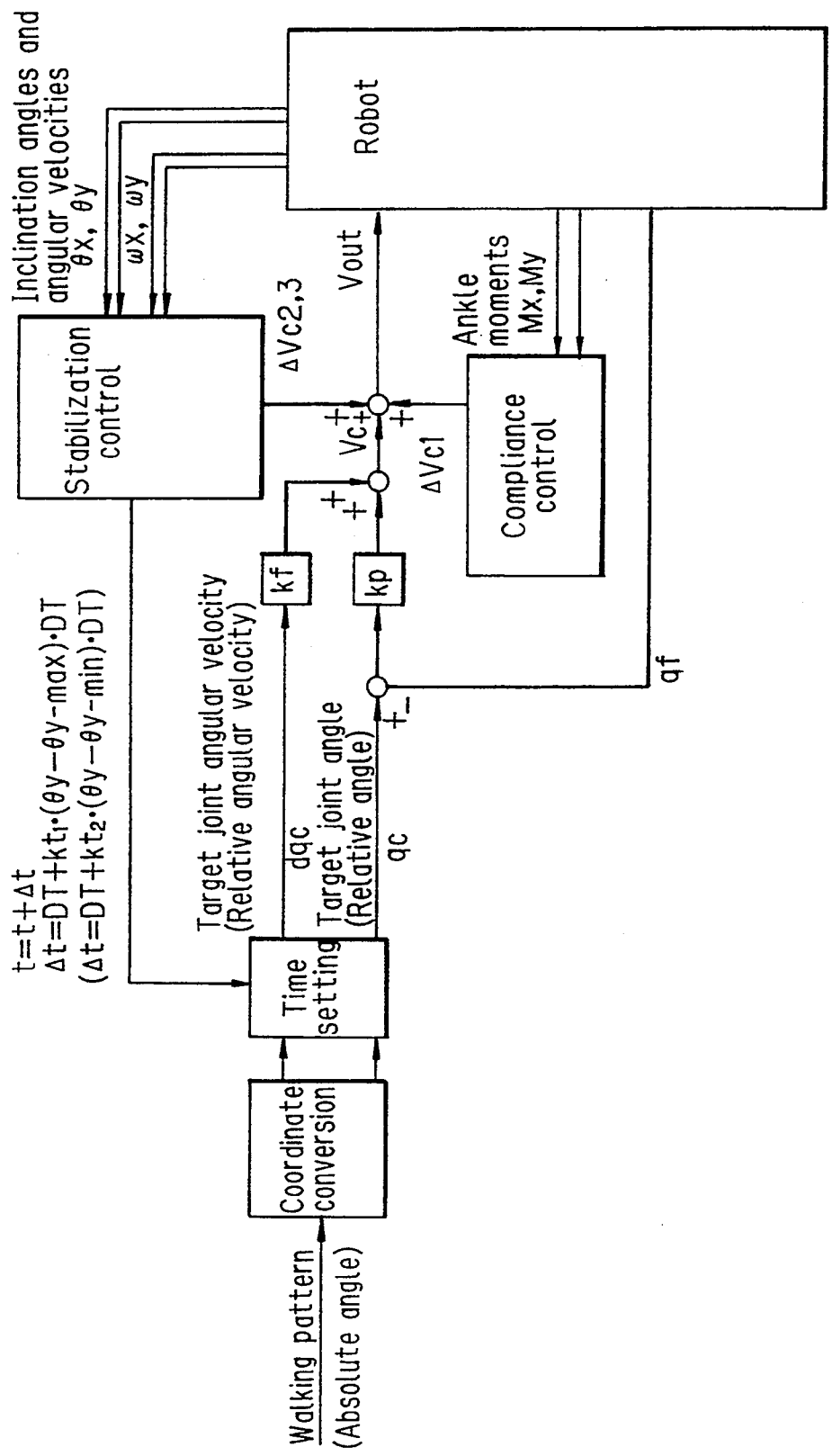
FIG. 21 is a block diagram, similar to FIG. 3, but showing a second embodiment of the invention.

FIG. 21 and thereafter show a second embodiment of the invention. In the second embodiment, when the robot's attitude is found to be unstable from the detected inclination angle $\epsilon y$, the time t is varied. Namely, an interval of the target time series data is varied such that robot's leg lands at a time earlier than the scheduled time if the robot, for example, tilts forward. The interval will be referred to hereinafter as "DT" [sec.] which is a fixed value.

The second embodiment will here be explained with reference to the flow chart of FIG. 22.

Figure 23:
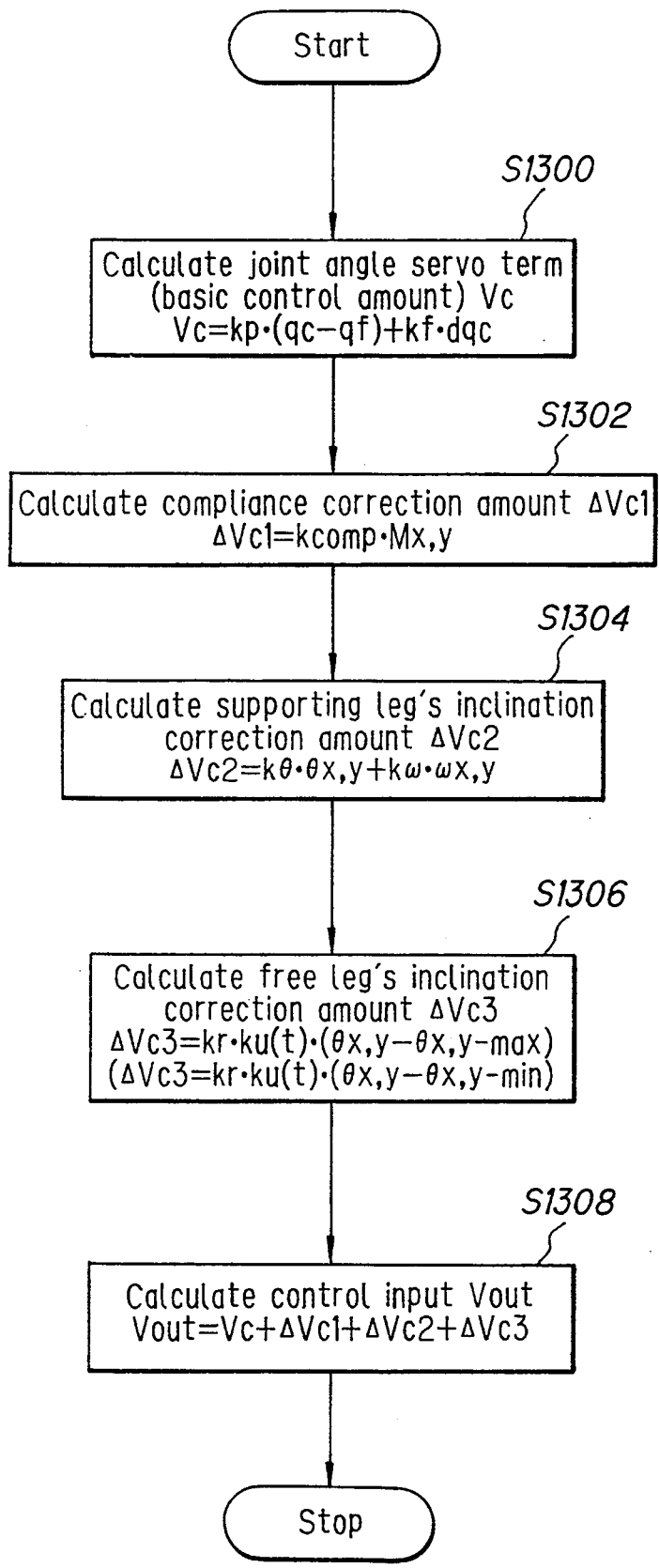
FIG. 23 is a flow chart, similar to FIG. 8, but showing the subroutine of the control input calculation in the second embodiment referred to in the flow chart of FIG. 22.

Similar to the first embodiment, the second embodiment starts at step S1200 and advances, via step S1202, to step S1204 to wait for the time interrupt, i.e. the interval DT [sec.]. And if the interrupt occurs, control passes, via steps S1206 and S1208, to step S1210 in which the control input Vout is calculated following the subroutine flow chart illustrated in FIG. 23. The calculation is quite the same as that of the first embodiment explained with reference to FIG. 8, except that the touchdown correction amount delta q is no longer calculated.

Control then passes to step S1212 in which the calculated control input Vout is output, to step S1214 in which the detected inclination angle $\theta y$ is again compared with the first prescribed value $\theta y-\max$, and if it is found to be larger, to step S1216 in which the value of delta t determining the next time (t+delta t) is corrected in the manner shown. If the inclination angle $\theta y$ is found to be not greater than the first predetermined value in step S1214, control passes to step S1218 in which it is compared with the second prescribed value $\theta y-\min$, and if it is found to be smaller, to step S1220 in which delta t is corrected in the manner shown, and if it is found to be larger, to step S1222 in which the value of delta t is defined to be DT (the aforesaid fixed value). Control then passes to step S1224 in which value of delta t determined is added to time t to obtain the next time and to step S1226 in which the target value for the next time is read, whereafter the same processing is repeated until step S1202 finds that the locomotion has been terminated.

Thus in this second embodiment of the invention, basic control of the individual joints to their target angles qc(t) is conducted once every fixed time period (delta t=DT). When the inclination angle of the body 24 exceeds the prescribed limits ($\theta y-\max$, $\theta y-\min$), however, it is judged that the robot's attitude has become unstable and the basic time period for updating the target angles (unit refresh time delta t) is corrected in the manner shown in steps S1216 and S1220. (kt1 and kt2 in steps S1216, S1220 can be fixed or variable, provided that kt1, kt2>0.) To be specific, when the inclination angle exceeds $\theta y-\max$, step S1216 makes the value of delta t larger than the fixed value DT so that the target angles are set using data intended to be used later. As a result, when the robot tilts forward on encountering rough terrain, for example, the free leg touches down before the scheduled time, making it possible to restore the robot to the proper attitude promptly. On the other hand, when the inclination angle is smaller than $\theta y-\min$, the equation of step S1220 makes the value of delta t smaller than the fixed value DT so that the target angles are set using data intended to be used earlier. As a result, when the robot tilts rearward, the free leg touches down after the scheduled time, again enabling the robot to be restored promptly to its proper attitude. (When, in an extreme case, the value of delta t becomes negative in step S1220, previously used target angles are used.) If no data corresponding to time t+delta t has been stored in memory, either the data for the nearest time for which such date is available is used or corresponding data is calculated by interpolation.

In the embodiment just described, the control unit of a biped walking robot equipped with a joint angle servo system corrects the unit time for refreshing the target values on the basis of the inclination of the robot's body. As a result, the robot is able to walk stably at all times, even when it encounters rough terrain not anticipated by the walking pattern. Moreover, since the control uses predefined target values, the system can be realized with a control unit that is compact and light enough to be installed in a legged mobile robot. Moreover, since the embodiment is configured such that the amount of control is corrected on the basis of inclination for both the supporting leg and the free leg, the walking stability is further enhanced. Also, since compliance control is conducted during footfall, the impact experienced at such times can be efficiently absorbed.

In the foregoing embodiment, various corrections are conducted with respect to the basic control amount. It is not necessary to conduct all of these, however, and certain ones can be selected as desired.

Figure 22:
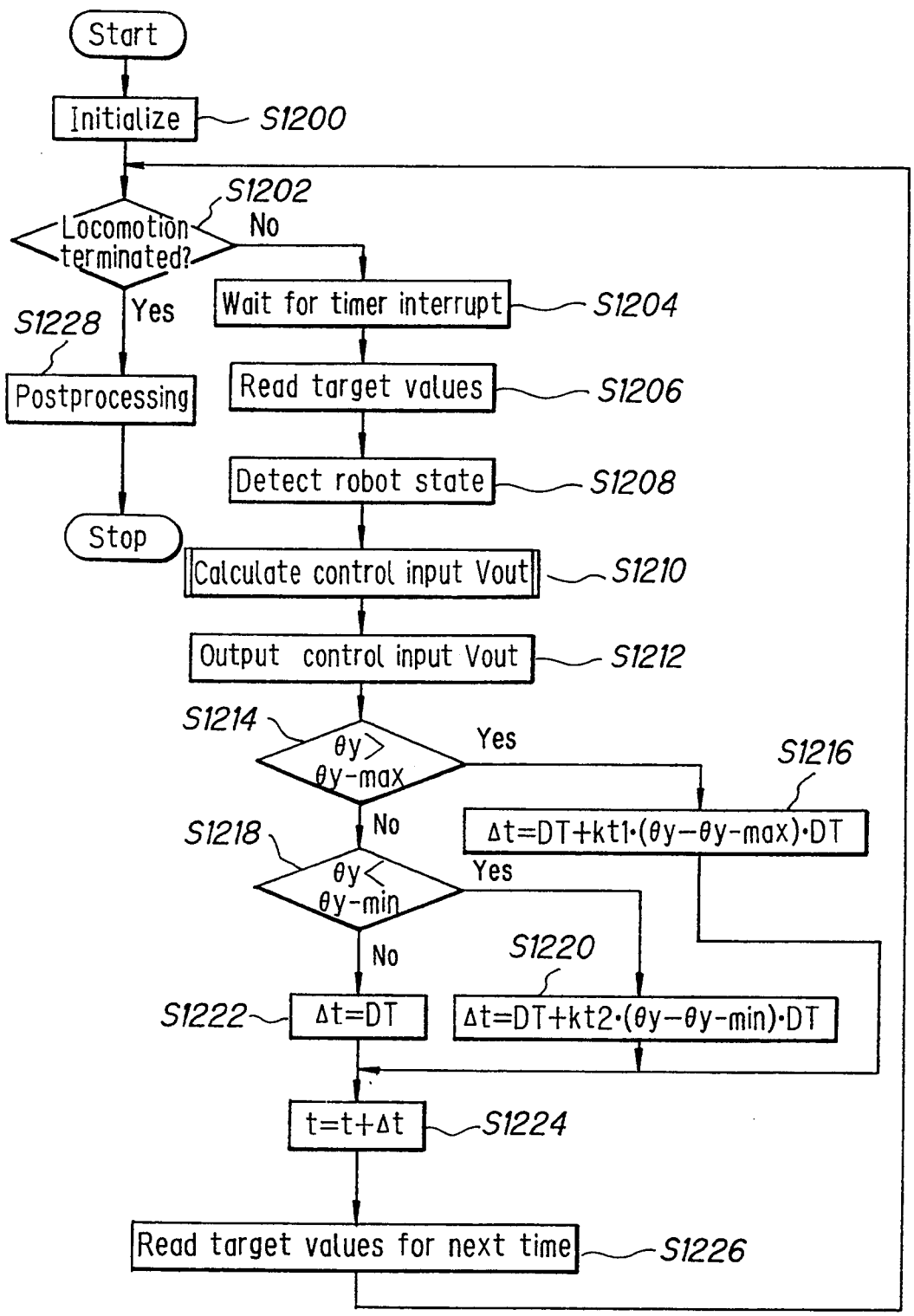
FIG. 22 is a flow chart showing the operation of the control system illustrated in FIG. 21.

Further, while the values of $\theta y-\max$ and $\theta y-\min$ used in steps S1216 and S1220 of the flow chart of FIG. 22 are those used in steps S602 and S606 of the flow chart of FIG. 13, different values can be used instead. It is also possible to correct the time period on the basis of the inclination angular velocity rather than on the basis of the inclination angle.

In the first and the second embodiments, instead of defining the walking pattern in terms of absolute angles as shown in FIGS. 3 and 21, it is possible to define it in terms of relative angles or to define it not in terms of angles but in terms of a superordinate concept such as the trajectory of the center of gravity or the trajectories of the toes. If the walking pattern is designed in terms of relative angles, however, since the inclination angle is detected with respect to the absolute angler the relative angle should be converted into the absolute angle through a coordinate conversion.

While the invention was described with respect to a biped walking robot as an example of a legged robot, the invention can also be applied to legged robots other than the biped one.

Moreover, the present invention has thus been shown and described with reference to the specific embodiments. However, it should be noted that the present invention is in no way limited to the details of the described arrangements, changes and modifications may be made without departing from the scope of the appended claims.

What is claimed is:

1. A system for controlling locomotion of a biped walking robot having a body and two articulated legs each connected to the body through a hip joint and each having at least an ankle joint, comprising:
    servo motor means provided at individual joints of the robot;
    first means for establishing a walking pattern of the robot in terms of angles with respect to the direction of gravity;
    second means for determining a target angle of each joint from the established walking pattern;
    third means for detecting an actual angle of each joint;
    fourth means for determining a basic control amount for each joint in response to a deviation between the target angle and the detected actual angle of each joint;
    fifth means for detecting a differential of n-th order of an actual inclination angle of the body with respect to the direction of gravity;
    sixth means for determining a first control correction amount for at least one of the hip joint and the ankle leg which supports the robot's weight in response to the detected differential of n-th order of the actual inclination angle of the body; and
    control means for correcting the basic control amount by the first control correction amount to determine a control value for each servo motor means and for providing the determined control value to the servo motor means.

2. A system according to claim 1, wherein said sixth means determines the first control correction amount by multiplying the detected differential of n-th order or the actual inclination of the body by a gain.

3. A system according to claim 1, wherein said sixth means determines the first control correction amount by multiplying the detected inclination angle and angular velocity of the body by a first gain and a second gain.

4. A system according to claim 1, further including;
    seventh means for detecting at least one of acting on the ankle joint to determine a second control correction amount by multiplying the detected moment and said control means corrects the control value for the ankle joint by the second control correction amount.

5. A system for controlling locomotion of a biped walking robot having a body and two articulated legs each connected to the body through a hip joint and each having at least an ankle joint comprising:
    servo motor means provided at the individual joints of the robot;
    first means for establishing a walking pattern in terms of angles with respect to the direction of
    second means for determining a target angle of each joint from the established walking pattern;
    third means for detecting an actual angle of each joint;
    fourth means for determining a basic control amount for each joint in response to a deviation between the target angle and the detected actual angle of each joint;
    fifth means for detecting an angle of the ankle joint of a supporting leg which lands on the ground with respect to the direction of gravity; and
    said second means correcting the target angle for the ankle joint of the supporting leg in response to the detected angle.

6. A system for controlling locomotion of a biped walking robot having a body and two articulated legs each connected to the body through a hip joint and each having an ankle joint, comprising:
    servo motor means provided at the individual joints of the robot;
    first means for establishing a walking pattern of the robot in terms of angles with respect to the direction of gravity;
    second means for determining a target angle of each from the established walking pattern;
    third means for detecting an actual angle of each
    fourth means for determining a basic control amount for each joint in response to a deviation between the target angle and the detected actual angle of each joint;
    fifth means for detecting a differential of n-th order of an actual inclination angle of the body with respect to the direction of gravity;
    sixth means for determining a first control correction amount for at least one of the hip joint and the ankle joint of a leg which supports the robot's weight in response to the detected differential of n-th order of the actual inclination angle of the body; and
    seventh means for determining a second control correction amount of at least one of the hip joint and an ankle joint of a free leg lifted off the ground in response to the detected differential of n-th order of the actual inclination angle of the body; and
    control means for correcting the basic control amount by the first and the second control correction amounts to determine a control value for each servo motor means and for providing the determined control value to the servo motor means.

7. A system according to claim 6, wherein said seventh means compares the detected differential of n-th order of the actual inclination angle of the body with a reference value and determines the second control correction amount in response to the comparison result.

8. A system according to claim 6, wherein said seventh means holds the second control correction amount over a period during which the free leg is landed and then decreases the second control correction amount with respect to time.

9. A system according to claim 6, wherein the joints are assigned priority in the order of the hip joint of the supporting leg, the ankle joint of the supporting leg and the hip joint of the free leg, and said control means determines the control value at least partially following the order.

10. A system according to claim 6, further including:
eighth means for detecting an angle of the ankle joint of the supporting leg with respect to the direction of gravity; and
said second means corrects the target angle of the ankle joint in response to the detected angle.

11. A system according to claim 6, further including:
ninth means for detecting at least one of moment and force acting on the supporting leg to determine a third control correction amount; and
said control means corrects the control value for the ankle joint of the supporting leg by the third control correction amount.

12. A system for controlling locomotion of a legged walking robot having a body and a plurality of legs connected to the body, including:
servo motor means provided at individual joints of the robot; and
control means for providing a control value in time series at a predetermined interval in accordance with a preestablished walking data to each servo motor means such that the servomotor means drives the associated joint to a target angle;
wherein the improvement comprises;
first means for measuring differential of n-th order of an actual inclination angle of the body with respect to time to detect a posture of the robot; and
said control means changing the predetermined interval when the detected posture is determined to be out of a predetermined posture such that the robot's leg lands at a time other than a scheduled time.

13. A system according to claim 12, wherein said first means compares the measured value with a reference value, and determines if the posture is out of the predetermined posture.

14. A system according to claim 13, wherein the reference value is the robot body's inclination angle and angular velocity at which the robot is able to keep its posture stable.

15. A system for controlling locomotion of a biped robot having a body and two articulated legs each connected to the body through a hip joint and each having an ankle joint, comprising:
servo motor means provided at the individual joints of the robot;
first means for establishing a walking in terms of angles with respect to the direction of
second means for determining a target angle of each joint from the established walking pattern;
third means for detecting an actual angle of each joint;
fourth means for determining a basic control amount for each joint in response to a deviation between the target detected actual angle of each joint;
fifth means for detecting a differential of n-th order of an actual inclination angle of the body with direction of gravity;
sixth means for determining a first control correction amount for at least one of the hip joint and the ankle joint of a leg which supports the robot's weight in response to the detected differential of n-th order of the actual inclination angle;
control means for correcting the basic control amount by the first control correction amount to determine a control value in time series at a predetermined interval for each servo motor means and for providing the determined control value to the servo motor means concerned; and
seventh means for detecting a posture of the robot; and
said control means changing the predetermined interval when the detected posture is determined to be out of a predetermined posture.

16. A system for controlling locomotion of a biped walking robot having a body and two articulated legs each connected to the body through a hip joint and each having an ankle joint, comprising:
servo motor means provided at the individual joints of the robot;
first means for establishing a walking pattern of the robot in terms of absolute angles;
second means for determining a target angle of each joint from the established walking pattern;
third means for detecting an actual angle of each joint;
fourth means for determining a basic control amount for each joint in response to a deviation between the target angle and the detected actual angle of each joint;
fifth means for detecting a differential of n-th order of an actual inclination angle of the body with respect to the direction of gravity;
sixth means for determining a first control correction amount for at least one of the hip joint and the ankle joint and the ankle joint of a leg which supports the robot's weight in response to the detected differential of n-th order of the actual inclination angle;
seventh means for determining a second control correction amount of at least one of the hip joint and an ankle free leg lifted off of the ground in response to the detected differential of n-th order of the actual inclination angle;
control means for correcting the basic control amount first and the second control correction amounts to determine a control value for each servo motor means and for providing the determined control value to the servo motor means;
eighth means for detecting an posture of the robot; and
said control means changing the predetermined interval when the detected posture is determined to be out of a predetermined posture such that the robot's leg lands at a time other than a scheduled time.

17. A controller of a servo motor for joints of a biped walking robot having a body and two articulated legs, each connected to the body through a hip joint and each having at least an ankle joint, comprising:
a first control loop for determining a velocity command to be applied to the servo motor by obtaining a deviation between a target joint, determined from a walking pattern established in terms of an angle with respect to the direction of gravity, and an actual joint and multiplying it by a gain;
a second control loop provided at an inner side of the first control loop for determining a second velocity command to be added to the first velocity command by detecting at least one of an actual inclination angle or an actual inclination angular velocity of the body with respect to the direction of gravity and by multiplying the actual inclination angle or the actual inclination angle velocity it by a second gain; and control means for determining a control command to the servo motor from the first and second velocity commands.

18. A controller according to claim 17, further including:

a third control loop provided at the inner side of the first control loop for determining a third velocity command to be added to the first velocity command by detecting at least one of an actual inclination angle and an actual inclination angular velocity of the body with respect to the direction of gravity to obtain a difference from a reference value and by multiplying the difference by a second gain; and said control means determines the control command to the servo motor from the first, second and third velocity commands.

19. A controller according to claim 17, further including:

a fourth control loop provided at the inner side of the control loop for determining a fourth velocity command to be added to the first and second velocity commands by detecting at least one of moment and force acting on at least one among the joints of the robot; and said control means determines the control command to the servo motor from the first, second and fourth velocity commands.

20. A controller according to claim 17, further including:

detecting means for detecting an actual angle of an ankle joint with respect to the direction of gravity; and said first control loop corrects the target angle by the detected actual angle.

* * * * *

UNITED STATES PATENT AND TRADEMARK OFFICE
CERTIFICATE OF CORRECTION

PATENT NO. : 5,349,277
DATED : September 20, 1994
INVENTOR(S) : Takahashi et al.

Page 1 of 2

It is certified that error appears in the above-indentified patent and that said Letters Patent is hereby corrected as shown below:

Column 11, line 42, after "ankle" insert -- joint of a --.

Column 11, line 59, after "one of" insert -- moment and force --.

Column 11, line 62, after "ment" insert -- by a gain, --.

Column 12, line 1, delete "the".

Column 12, line 3, after "pattern" insert -- of the robot --.

Column 12, line 4, after "direction of" insert -- gravity; --.

Column 12, line 23, delete "the".

Column 12, line 29, after "each" insert --joint --.

Column 12, line 30, after "each" insert --joint;--.

Column 13, line 47, delete "the".

Column 13, line 49, after "walking" insert -- pattern of the robot --.

Column 13, line 50, after "direction of" insert -- gravity; --

Column 13, line 37, after "target" insert -- angle and the --.

Column 13, line 59, after "with" insert -- respect to the --.

Column 14, line 13, delete "the".

Column 14, line 30, delete "and the ankle joint".

Column 14, line 36, after "ankle" insert --joint of a --.

UNITED STATES PATENT AND TRADEMARK OFFICE
CERTIFICATE OF CORRECTION

PATENT NO. : 5,349,277
DATED : September 20, 1994
INVENTOR(S) : Takahashi et al.

It is certified that error appears in the above-indentified patent and that said Letters Patent is hereby corrected as shown below:

Column 14, line 40, after "amount" insert -- by the --.

Column 15, line 1, delete "angle" and substitute -- angular --.

Signed and Sealed this

Twenty-eighth Day of November 1995

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,349,277
DATED : September 20, 1994
INVENTOR(S) : H. Takahashi et al.

It is certified that error appears in the above-identified patent and that said Letters Patent is hereby corrected as shown below:

Column 11, line 4, after "absolute" change "angler" to --angle,--.

Column 11, line 51, after "order" change "or" to -- of --.

Column 15, line 1, delete "it".

Signed and Sealed this

Fifth Day of November, 1996

Attest:

BRUCE LEHMAN

Attesting Officer    Commissioner of Patents and Trademarks